US011556160B2

(12) United States Patent
Kim et al.

(10) Patent No.: US 11,556,160 B2
(45) Date of Patent: Jan. 17, 2023

(54) ELECTRONIC DEVICE FOR ADJUSTING VOLTAGE AND OPERATING METHOD THEREFOR

(71) Applicant: Samsung Electronics Co., Ltd., Gyeonggi-do (KR)

(72) Inventors: Kunsuk Kim, Gyeonggi-do (KR); Jehwan Lee, Gyeonggi-do (KR); Sangwook Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/769,302

(22) PCT Filed: Nov. 30, 2018

(86) PCT No.: PCT/KR2018/015043
§ 371 (c)(1),
(2) Date: Jun. 3, 2020

(87) PCT Pub. No.: WO2019/112251
PCT Pub. Date: Jun. 13, 2019

(65) Prior Publication Data
US 2021/0173463 A1 Jun. 10, 2021

(30) Foreign Application Priority Data
Dec. 4, 2017 (KR) .................. 10-2017-0165262

(51) Int. Cl.
*G06F 1/28* (2006.01)
*G06F 1/20* (2006.01)
*H02M 3/158* (2006.01)

(52) U.S. Cl.
CPC ............... *G06F 1/28* (2013.01); *G06F 1/206* (2013.01); *H02M 3/1582* (2013.01)

(58) Field of Classification Search
CPC ......... G06F 1/28; G06F 1/206; H02M 3/1582
See application file for complete search history.

(56) References Cited

U.S. PATENT DOCUMENTS 10,476,395 B2 * 11/2019 Dai .................. H02M 3/33507
2005/0184712 A1 8/2005 Wei et al.
(Continued)

FOREIGN PATENT DOCUMENTS

| JP | 2015-082198 A | 4/2015 |
| JP | 2016-025804 A | 2/2016 |
| JP | WO2016/139745 A1 | 9/2016 |

OTHER PUBLICATIONS

Notice of Preliminary Rejection dated Apr. 7, 2022.
Notice of Patent Grant dated Oct. 20, 2022.

*Primary Examiner* — Aurel Prifti
(74) *Attorney, Agent, or Firm* — Cha & Reiter, LLC

(57) ABSTRACT

Disclosed in various embodiments of the present invention are an electronic device for adjusting a voltage and an operating method therefor. The electronic device comprises: at least one first converter for supporting a plurality of operating modes for changing voltage; a second converter supporting the plurality of operating modes and connected with the at least one first converter in series; and at least one processor, wherein the processor can be configured to determine an intermediate voltage between the at least one first converter and the second converter on the basis of an input voltage of the at least one first converter and an output voltage of the second converter, and control an operating mode of each of the at least one first converter and the second converter on the basis of the determined intermediate voltage. Other embodiments are also possible.

14 Claims, 12 Drawing Sheets

(56) References Cited

U.S. PATENT DOCUMENTS

| | | | |
|---|---|---|---|
| 2012/0054503 A1* | 3/2012 | Hsiao | G06F 1/3296 |
| | | | 713/300 |
| 2012/0081086 A1 | 4/2012 | Van Dijk et al. | |
| 2013/0093514 A1* | 4/2013 | Xu | H02M 3/1582 |
| | | | 330/129 |
| 2013/0114306 A1* | 5/2013 | Kooken | H02M 1/10 |
| | | | 363/21.01 |
| 2013/0271077 A1* | 10/2013 | Kim | H02J 7/022 |
| | | | 320/109 |
| 2014/0266044 A1 | 9/2014 | Kang et al. | |
| 2014/0362605 A1* | 12/2014 | Jang | H02M 3/3353 |
| | | | 363/17 |
| 2016/0105110 A1* | 4/2016 | Houston | H02M 3/1582 |
| | | | 323/271 |
| 2016/0241078 A1* | 8/2016 | Miyoshi | H02J 7/007 |
| 2017/0179715 A1 | 6/2017 | Huang et al. | |
| 2017/0271873 A1* | 9/2017 | Huang | H02J 7/34 |
| 2018/0115246 A1* | 4/2018 | Azrai | H02M 3/07 |
| 2018/0129234 A1* | 5/2018 | Melgar | G05F 1/563 |
| 2018/0301905 A1* | 10/2018 | Dai | H02J 3/383 |
| 2019/0165665 A1* | 5/2019 | Dai | H02M 7/53871 |
| 2020/0099300 A1* | 3/2020 | Ishikawa | H02P 27/08 |

\* cited by examiner

ELECTRONIC DEVICE FOR ADJUSTING VOLTAGE AND OPERATING METHOD THEREFOR

CROSS-REFERENCE TO RELATED APPLICATION(S)

This application is a National Phase Entry of PCT International Application No. PCT/KR2018/015043, which was filed on Nov. 30, 2018, and claims priority to Korean Patent Application No. 10-2017-0165262, which was filed on Dec. 4, 2017, the contents of which are incorporated herein by reference.

TECHNICAL FIELD

Various embodiments of the disclosure relate to an apparatus for adjusting a voltage in an electronic device and an operating method thereof.

BACKGROUND ART

Electronic devices, including portable terminals, tablet computers, smart phones, notebook Personal Computers (PCs), convertible notebook PCs, and the like, use batteries as power supply apparatuses for the purpose of portability. In an electronic device, a battery may be charged with power supplied from an external power supply apparatus.

An electronic device may include a DC-to-DC converter which adjusts (or converts) power, supplied from an external power supply apparatus, into a voltage appropriate for charging a battery. For example, the electronic device may include a DC-to-DC converter, such as a buck converter, a boost converter, or a buck-boost converter.

DISCLOSURE OF INVENTION

Technical Problem

A buck converter drops an input voltage and outputs the dropped input voltage, and a boost converter boosts an input voltage and outputs the boosted input voltage, and thus each of the buck converter and the boost converter has a limitation on a magnitude of the input voltage in a state in which an output voltage is fixed. Example of the limitations includes that a magnitude of an input voltage of the buck converter should be less than a magnitude of an output voltage which is a voltage appropriate for charging a battery and a magnitude of an input voltage of the boost converter should be greater than the magnitude of the output voltage which is the voltage appropriate for charging the battery. When an input voltage is lower than a reference voltage, a buck-boost converter may boost the input voltage and may output the boosted input voltage, and when the input voltage is higher than the reference voltage, may drop the input voltage and may output the dropped input voltage. The buck-boost converter does not have a limitation on an input voltage, but has a disadvantage of being ineffective in terms of heat generation. For example, the buck-boost converter is problematic in that the buck-boost converter may be more easily overheated than the buck converter or the boost converter.

In order to solve the above-mentioned problems, various embodiments of the disclosure provide an apparatus for adjusting a voltage in an electronic device and an operating method thereof.

Solution to Problem

In accordance with an aspect of the disclosure, an electronic device may include: at least one first converter configured to support a plurality of operating modes for changing a voltage; a second converter configured to support the plurality of operating modes and be connected in series with the at least one first converter; and at least one processor, wherein the processor is configured to: determine an intermediate voltage between the at least one first converter and the second converter based on an input voltage of the at least one first converter and an output voltage of the second converter; and control an operating mode of each of the at least one first converter and the second converter based on the determined intermediate voltage.

In accordance with another aspect of the disclosure, an operating method of an electronic device may include: determining an intermediate voltage between at least one first converter and a second converter based on an input voltage of the at least one first converter and an output voltage of the second converter; and controlling an operating mode of each of the at least one first converter and the second converter based on the determined intermediate voltage.

In accordance with still another aspect of the disclosure, an electronic device may include: at least one first buck-boost converter configured to be capable of dropping or boosting a voltage; a second buck-boost converter configured to be connected in series with the at least one first buck-boost converter and be capable of dropping or boosting a voltage; and at least one processor, wherein the processor is configured to: determine an intermediate voltage between the at least one first buck-boost converter and the second buck-boost converter based on an input voltage of the at least one first buck-boost converter and an output voltage of the second buck-boost converter; and control each of the at least one first buck-boost converter and the second buck-boost converter to drop or boost a voltage, based on the determined intermediate voltage.

Advantageous Effects of Invention

According to various embodiments of the disclosure, an electronic device adjusts a voltage by using at least two buck-boost converters connected in series with each other so as to maximize power efficiency, so that it is possible to reduce the amount of input power required to use the electronic device and charge a battery. Further, the electronic device controls an operating mode of each of the at least two buck-boost converters connected in series with each other based on a temperature, so that it is possible to prevent an overheating phenomenon of the electronic device.

BEST MODE FOR CARRYING OUT THE INVENTION

Figure 1:
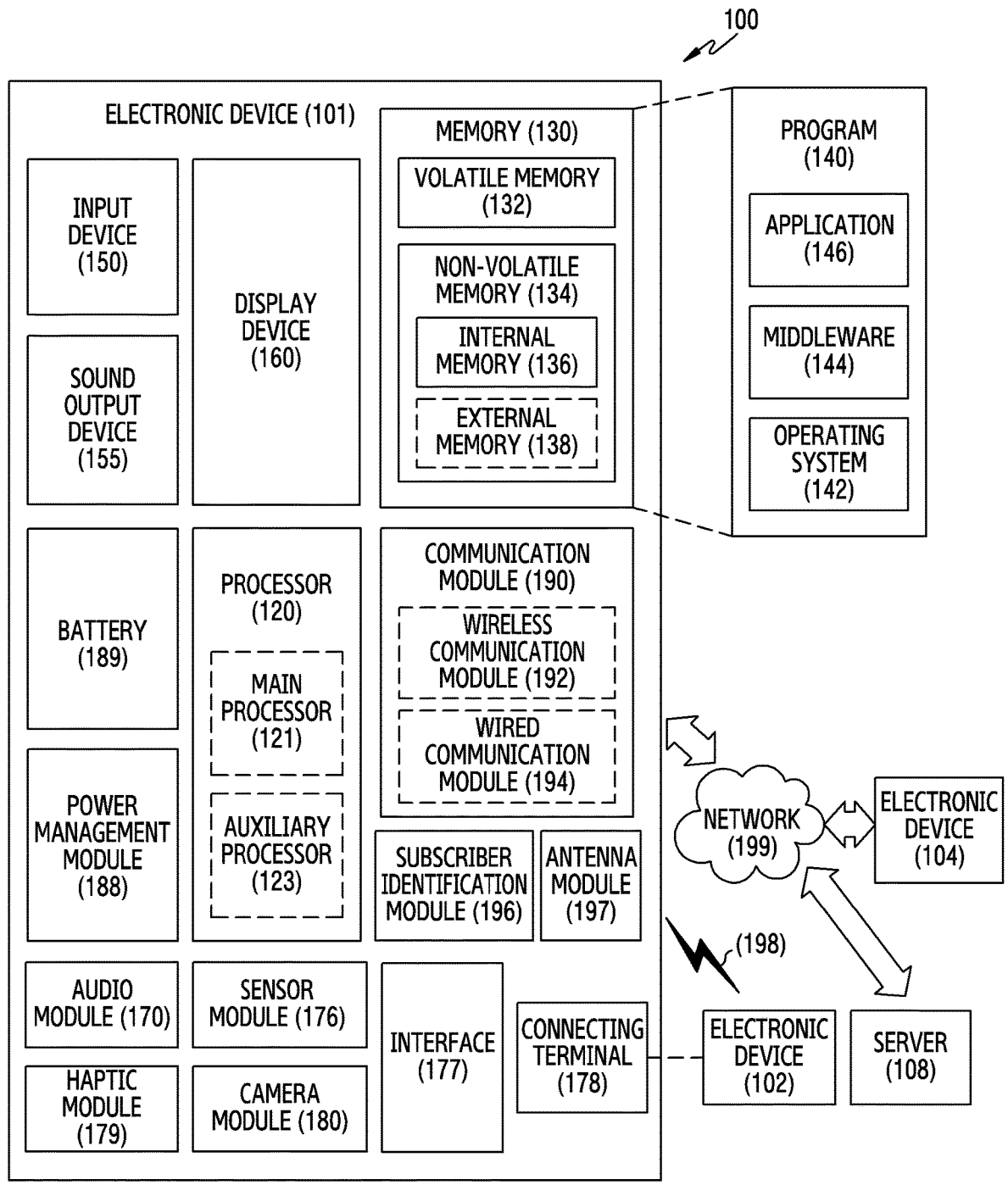
FIG. 1 is a block diagram of an electronic device 101 in a network environment 100 according to various embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
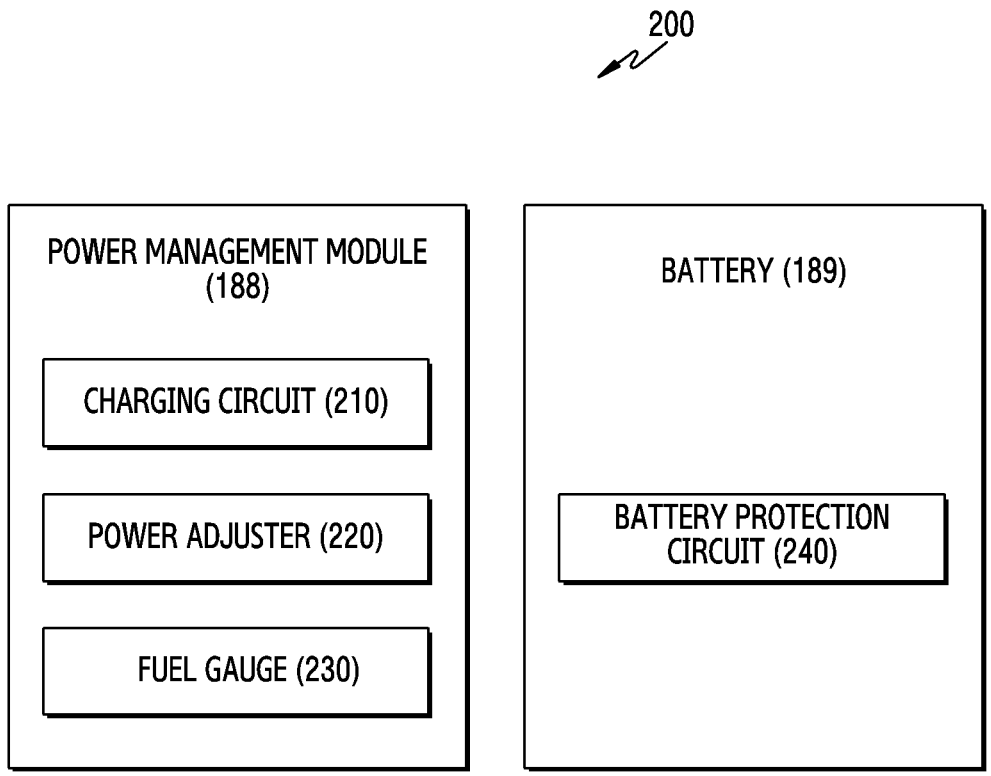
FIG. 2 is a block diagram 200 of a power management module 188 and a battery 189 according to various embodiments.

FIG. 2 is a block diagram 200 of a power management module 188 and a battery 189 according to various embodiments. Referring to FIG. 2, the power management module 188 may include a charging circuit 210, a power adjuster 220, or a fuel gauge 230. The charging circuit 210 may charge the battery 189 by using power supplied to the electronic device 101 from an external power source. According to an embodiment, the charging circuit 210 may select a charging scheme (e.g., normal charging or quick charging) based at least in part on the type of external power source (e.g., a power adapter, a USB, or wireless charging), the magnitude of power suppliable from the external power source (e.g., about 20 watts or more), or an attribute of the battery 189, and may charge the battery 189 by using the selected charging scheme. The external power source may be connected to the electronic device 101, for example, wiredly via the connecting terminal 178 or wirelessly via the antenna module 197.

The power adjuster 220 may generate a plurality of powers having different voltage levels or different current levels by adjusting a voltage level or a current level of power supplied from the external power source or the battery 189. The power adjuster 220 may adjust a voltage level or a current level of power supplied from the external power source or the battery 189 into a voltage level or a current level appropriate for each component of each of the elements constituting the electronic device 101. According to an embodiment, the power adjuster 220 may be implemented in the form of a Low Drop-Out (LDO) regulator or a switching regulator.

The fuel gauge 230 may measure use state information of the battery 189 (e.g., a capacity, the number of times of charging or discharging, a voltage, or a temperature of the battery).

The power management module 188 may use, for example, the charging circuit 210, the power adjuster 220, or the fuel gauge 230 to determine charging state information (e.g., lifetime, overvoltage, low voltage, overcurrent, overcharge, overdischarge, overheating, short-circuiting, or swelling) related to charging of the battery 189 based at least in part on the measured use state information of the battery 189. The power management module 188 may determine whether a state of the battery 189 is normal or abnormal, based at least in part on the determined charging state information. If the state of the battery 189 is determined to be abnormal, the power management module 188 may adjust the charging of the battery 189 (e.g., reduce the charging current or voltage, or stop charging). According to an embodiment, at least some of the functions of the power management module 188 may be performed by an external control apparatus (e.g., the processor 120).

According to an embodiment, the battery 189 may include a battery protection circuit (a Protection Circuit Module (PCM)) 240. The PCM 240 may perform various functions (e.g., a pre-cutoff function) of preventing performance degradation of, or damage to, the battery 189. Additionally, or alternatively, the PCM 240 may be configured as at least a part of a Battery Management System (BMS) configured to perform cell balancing, measurement of battery capacity, measurement of the number of times of charging or discharging, temperature measurement, or voltage measurement.

According to an embodiment, at least a part of the use state information or the charging state information of the battery 189 may be measured using the fuel gauge 230, the power management module 188, or a corresponding sensor (e.g., a temperature sensor) of the sensor module 276. In this configuration, according to an embodiment, the corresponding sensor (e.g., a temperature sensor) of the sensor module 176 may be included as a part of the PCM 140, or may be disposed near the battery 189 as an apparatus separated from the PCM.

Figure 3:
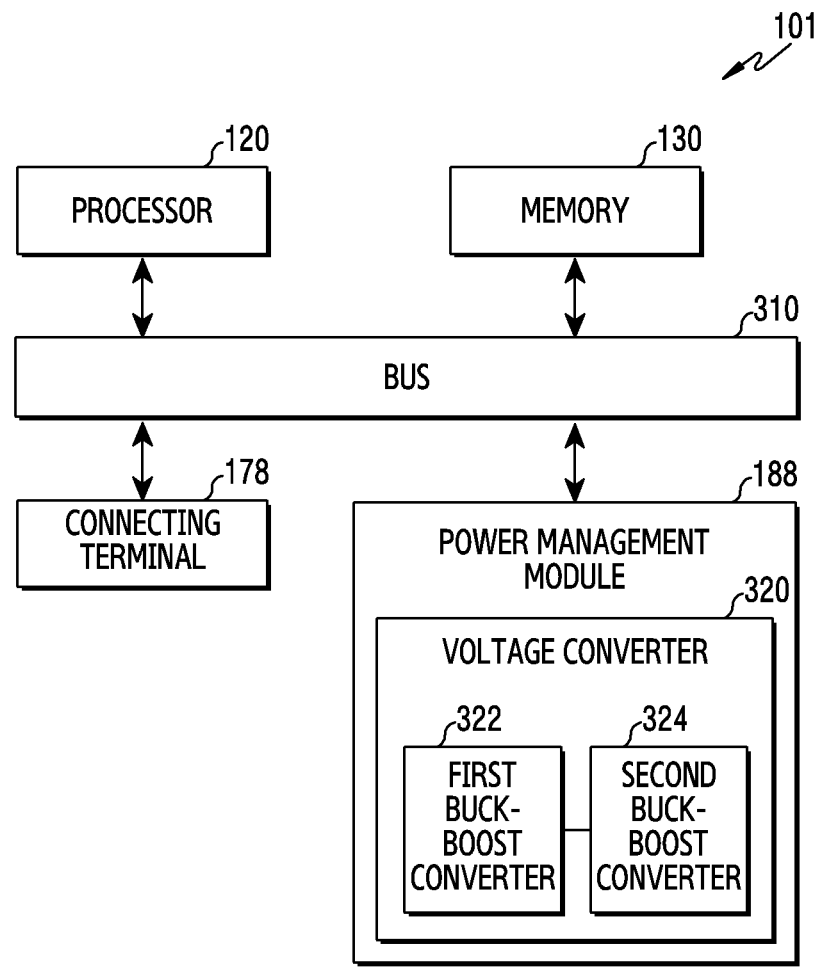
FIG. 3 is a block diagram of the electronic device 101 according to various embodiments.

FIG. 3 is a block diagram of the electronic device 101 according to various embodiments. The electronic device 101 of FIG. 3 may be the electronic device 101 illustrated in FIG. 1. Referring to FIG. 3, the electronic device 101 may include a bus 310, a processor 120, a memory 130, a connecting terminal 178, and a power management module 188. In some embodiments, at least one of the elements of the electronic device 101 may be omitted therefrom, or the electronic device 101 may additionally include another element. For example, the electronic device 101 of FIG. 3 may additionally include at least one of the elements constituting the electronic device 101 illustrated in FIG. 1.

According to various embodiments, the bus 310 may interconnect, for example, the elements 120, 130, 178, and 188, and may include a circuit configured to deliver communication (e.g., a control message and/or data) among the elements.

According to various embodiments, the processor 120 may execute software (e.g., the program 140) stored in the memory 130, and thus may control at least another element connected to the processor 120.

According to various embodiments, the processor 120 may detect that at least one external power supply apparatus is connected to the electronic device 101 via the connecting terminal 178, and may control the power management module 188 to adjust (or convert) an input voltage, supplied from the external power supply apparatus connected to the electronic device 101, into a preset output voltage. According to an embodiment, the processor 120 may control operations of a plurality of buck-boost converters 322 and 324 included in a voltage converter 320 of the power management module 188, based on at least one of at least one input voltage, output voltage, input current, or output current. The at least one input voltage and input current may be different according to the type of external power supply apparatus connected to the electronic device 101 via the connecting terminal 178. For example, when the type of external power supply apparatus is a power adapter, an input voltage may be about 20 volts, and when the type of external power supply apparatus is a USB, an input voltage may be about 5 volts. An output voltage may be preset to a voltage appropriate for charging the battery when the electronic device 101 is designed.

According to an embodiment, the processor 120 may determine an intermediate voltage which is a voltage between the plurality of buck-boost converters 322 and 324 connected in series with each other, based on at least one of at least one input voltage, output voltage, input current, or output current. For example, the processor 120 may search for an intermediate voltage corresponding to at least one input voltage, output voltage, input current, or output current in an intermediate-voltage table pre-stored in the memory 130, and may determine that the searched intermediate voltage is a voltage between the plurality of buck-boost converters 322 and 324. The intermediate-voltage table may include a value of an intermediate voltage corresponding to an input voltage, an output voltage, an input current, and/or an output current. For example, the intermediate-voltage table may include information indicating that an intermediate voltage corresponding to "an input voltage of 5 volts and an output voltage of 8 volts" is 10 volts, an intermediate voltage corresponding to "an input voltage of 20 volts, an output voltage of 6 volts, and an input current of 5 amps" is 12 volts, and an intermediate voltage corresponding to "input voltages of 5 volts and 20 volts, an output voltage of 8 volts, and input currents of 1 amps and 5 amps" is 13 volts. This configuration is only an example, and various embodiments of the disclosure are not limited thereto. An intermediate-voltage table may be pre-stored in the electronic device 101 by a designer when the electronic device 101 is designed. The intermediate-voltage table may be configured based on the power efficiency of the plurality of buck-boost converters 322 and 324 connected in series with each other. For example, each intermediate voltage included in the intermediate-voltage table may be set to a value having power efficiency optimal for a corresponding input voltage, output voltage, input current, and/or output current. Power efficiency may be determined based on a ratio of input power to output power. For example, the designer may measure power efficiency while an intermediate voltage is changed in a state of fixing an input voltage, an output voltage, an input current, and/or an output current of each of the plurality of buck-boost converters 322 and 324, and may then configure an intermediate-voltage table by using a scheme for selecting an intermediate voltage having the highest power efficiency. Power efficiency in a case in which one buck-boost converter operates according to each operating mode is described. When one buck-boost converter operates in a buck-boost mode, power efficiency of the one buck-boost converter may be measured to be highest, and when the one buck-boost converter operates in a boost mode, power efficiency thereof may be measured to be lowest. Operating modes of a buck-boost converter may be classified into a buck mode, a boost mode, and a buck-boost mode. A buck mode is a mode for dropping an input voltage and outputting the dropped input voltage, and may be referred to as a "step-down mode". A boost mode is a mode for boosting an input voltage and outputting the boosted input voltage, and may be referred to as a "step-up mode". A buck-boost mode is a mode for outputting a voltage having a magnitude identical to an input voltage, and may be referred to as a "step-up and down mode".

According to an embodiment, the processor 120 may determine an operating mode of each of the plurality of buck-boost converters 322 and 324 based on the determined intermediate voltage, and may control the voltage converter 320 such that the plurality of buck-boost converters 322 and 324 operate based on the determined intermediate voltage and the determined operating mode. For example, when an input voltage is 5 volts, an output voltage is 8 volts, and the determined intermediate voltage is 10 volts, the processor 120 may determine that an operating mode of a first buck-boost converter among the plurality of buck-boost converters 322 and 324 is a boost mode, and may determine that an operating mode of a second buck-boost converter thereamong is a buck mode. As another example, when an input voltage is 20 volts, an output voltage is 8 volts, and the determined intermediate voltage is 8 volts, the processor 120 may determine that an operating mode of the first buck-boost converter among the plurality of buck-boost converters 322 and 324 is a buck mode, and may determine that an operating mode of the second buck-boost converter thereamong is a buck-boost mode. The processor 120 may provide the voltage converter 320 with a signal including at least one piece of information among information on the determined intermediate voltage and information on an operating mode of each of the plurality of buck-boost converters 322 and 324.

According to various embodiments, the processor 120 may change an intermediate voltage based on a temperature of each of the plurality of buck-boost converters 322 and 324 included in the voltage converter 320, and may change an operating mode of each of the plurality of buck-boost converters 322 and 324 based on the changed intermediate voltage. For example, in order to prevent overheating of a particular buck-boost converter, the processor 120 may change an intermediate voltage based on the temperature of each of the plurality of buck-boost converters 322 and 324, and thus may control such that an operating mode of at least one of the plurality of buck-boost converters 322 and 324 is changed. A buck-boost converter operating in a buck-boost mode may be more easily overheated than a buck-boost converter operating in a buck mode or a boost mode, and a buck-boost converter operating in the boost mode may be more easily overheated than a buck-boost converter operating in the buck mode. According to an embodiment, when at least one buck-boost converter among the plurality of buck-boost converters 322 and 324 has a temperature higher than a first threshold temperature, the processor 120 may change an intermediate voltage so that an operating mode of the buck-boost converter having a temperature higher than the first threshold temperature can be changed. For example, when, in a state in which the first buck-boost converter 322 among the plurality of buck-boost converters 322 and 324 is operating in a buck-boost mode, a temperature of the first buck-boost converter 322 is measured to be higher than the first threshold temperature, the processor 120 may change a value of an intermediate voltage from a first value to a second value so that an operating mode of the first buck-boost converter 322 can be changed to a buck mode or a boost mode. According to an embodiment, when a buck-boost converter, which is operating in an operating mode changed by the changed intermediate voltage, has a temperature lower than a second threshold temperature, the processor 120 may re-change the changed intermediate voltage to another value, or may change the changed intermediate voltage to a previous value. The previous value may refer to an intermediate voltage which has optimal power efficiency and is configured by an intermediate-voltage table. The second threshold temperature may be lower than the first threshold temperature.

According to various embodiments, the processor 120 may change an intermediate voltage based on a change in input power and/or output power of the voltage converter 320, and may control an operation of each of the plurality of buck-boost converters 322 and 324 based on the changed intermediate voltage. According to an embodiment, when it is detected that an input voltage is changed by an external power supply apparatus or an output current is reduced by a continuous operation, the processor 120 may measure power efficiency while changing (dropping or boosting) an intermediate voltage by a predetermined value, and may select an intermediate voltage having optimal power efficiency. The processor 120 may control an operation of each of the plurality of buck-boost converters 322 and 324 based on the selected intermediate voltage. An operating mode of each of the plurality of buck-boost converters 322 and 324 may be maintained or changed according to an intermediate voltage.

According to various embodiments, the memory 130 may store software (e.g., the program 140) and input data and output data for commands related to the software. According to an embodiment, the memory 130 may store an intermediate-voltage table. As described above, an intermediate-voltage table may be pre-stored in the electronic device 101 by a designer when the electronic device 101 is designed.

According to various embodiments, the connecting terminal 178 may include at least one connector capable of connecting the electronic device 101 to at least one external power supply apparatus (e.g., a power adapter or a USB charging apparatus). According to an embodiment, the connecting terminal 178 may include two connectors capable of connecting both a power adapter and a USB charger to the electronic device 101.

Figure 4:
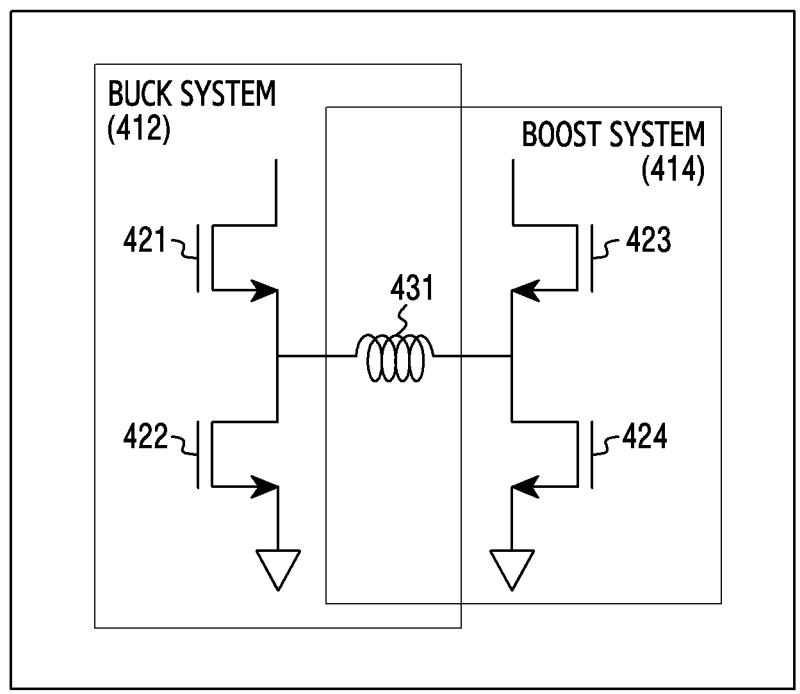
FIG. 4 illustrates a circuit configuration of a buck-boost converter according to various embodiments.

According to various embodiments, the power management module 188 may include the voltage converter 320 configured to convert an input voltage, supplied from an external power supply apparatus, into a preset output voltage. The voltage converter 320 may include the at least two buck-boost converters 322 and 324 connected in series with each other. Each of the at least two buck-boost converters 322 and 324 may be configured as illustrated in FIG. 4. A buck-boost converter 400 may include at least four transistors 421, 422, 423, and 424, and at least one inductor 431. The buck-boost converter 400 may operate in one of a buck mode (or a step-down mode) for dropping an input voltage and outputting the dropped input voltage, a boost mode (or a step-up mode) for boosting an input voltage and outputting the boosted input voltage, or a buck-boost mode (or a step-up and down mode) for outputting a voltage having a magnitude identical to an input voltage. The buck-boost converter 400 may include: a buck system 412 configured to drop an input voltage by using a first transistor 421, a second transistor 422, and an inductor 431; and a boost system 414 configured to boost an input voltage by using a third transistor 423, a fourth transistor 424, and the inductor 431. The buck system 412 and the boost system 414 may share the inductor 431. For example, when the buck-boost converter 400 operates in a buck mode, an input voltage is dropped by the buck system 412, and when the buck-boost converter 400 operates in a boost mode, an input voltage is boosted by the boost system 414. When the buck-boost converter 400 operates in a buck-boost mode, the buck system 412 and the boost system 414 may alternately operate, and thus an input voltage may be output while a magnitude of the input voltage is maintained. The buck-boost converter 400 may adjust an on/off time of each of the transistors included in the buck system 412 and/or the boost system 414 based on an input voltage and an output voltage, so as to drop, boost, or maintain an input voltage, thereby outputting a voltage corresponding to a preset output voltage.

Figure 5:
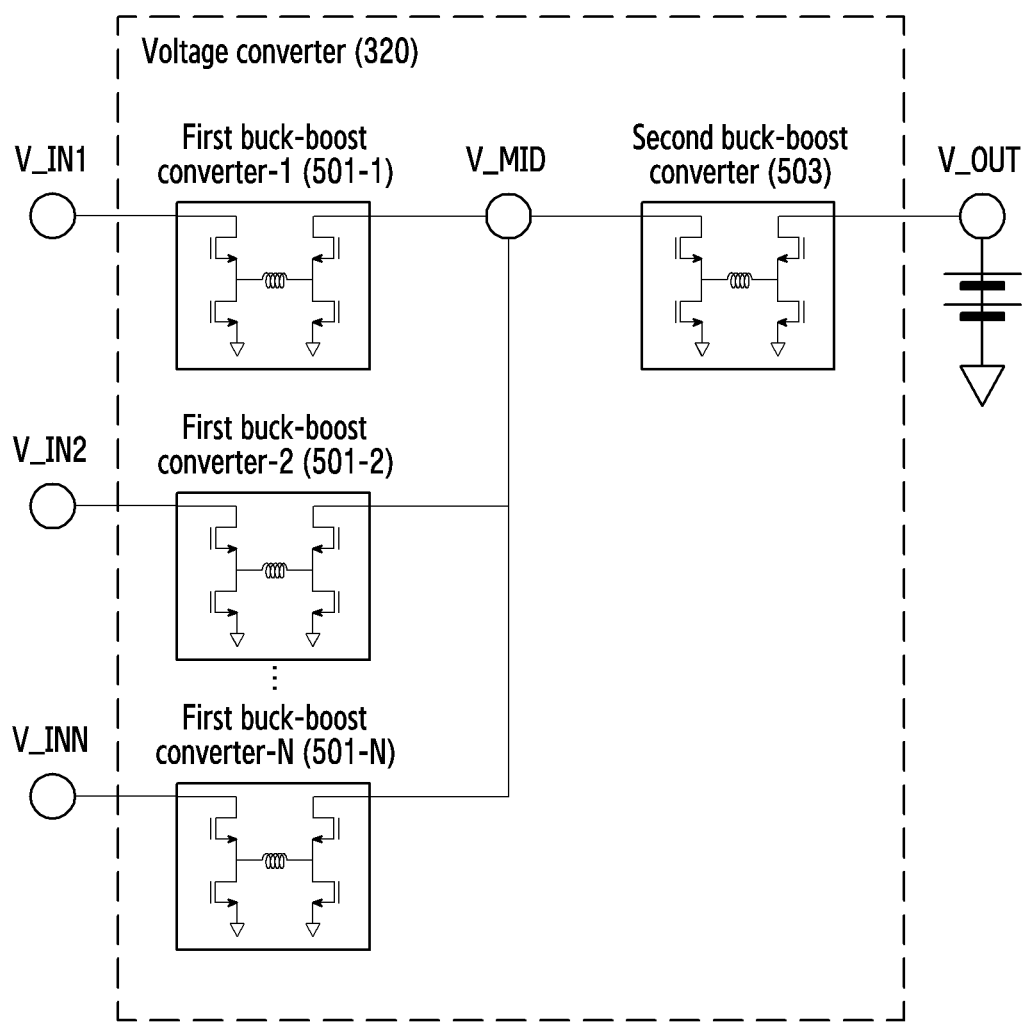
FIG. 5 illustrates a connection structure of a plurality of buck-boost converters according to various embodiments.

According to various embodiments, the at least two buck-boost converters 322 and 324 connected in series with each other may include at least one first buck-boost converter 322 configured to receive an input voltage from at least one external power supply apparatus, and a second buck-boost converter 324 configured to receive an input voltage (or an intermediate voltage) from the at least one first buck-boost converter 322. For example, when N external power supply apparatuses are all connected to the electronic device 101, the voltage converter 320 may include N first buck-boost converters 322. The N first buck-boost converters 322 may be connected in parallel. For example, as illustrated in FIG. 5, the voltage converter 320 may include: N first buck-boost converters 501-1, 501-2, ..., and 501-N connected in parallel; and one second buck-boost converter 503 connected in series with the N first buck-boost converters 501-1, 501-2, ..., and 501-N.

According to various embodiments, the at least one first buck-boost converter 322 and the second buck-boost converter 324 included in the voltage converter 320 may operate in one of a buck mode, a boost mode, or a buck-boost mode based on the intermediate voltage determined under the control of the processor 120. For example, when an input voltage supplied from an external power supply apparatus is 5 volts and an intermediate voltage is determined to be 10 volts in a state in which a preset output voltage is 8 volts, the at least one first buck-boost converter 322 may operate in the boost mode so as to adjust an input voltage of 5 volts into 10 volts, and the second buck-boost converter 324 may operate in the buck mode so as to adjust an input voltage (or an intermediate voltage) of 10 volts into 8 volts. As another example, when an input voltage supplied from an external power supply apparatus is 5 volts and an intermediate voltage is determined to be 5 volts in a state in which a preset output voltage is 8 volts, the at least one first buck-boost converter 322 may operate in the buck-boost mode so as to maintain and output an input voltage of 5 volts at a level of 5 volts, and the second buck-boost converter 324 may operate in the boost mode so as to adjust an input voltage (or an intermediate voltage) of 5 volts into 8 volts. The at least one first buck-boost converter 322 may adjust an on/off time of at least one transistor included in the at least one first buck-boost converter 322, based on an input voltage supplied from an external power supply apparatus and an intermediate voltage determined by the processor 120, and thus may adjust the input voltage into the intermediate voltage. The second buck-boost converter 324 may adjust an on/off time of at least one transistor included in the second buck-boost converter 324, based on an intermediate voltage determined by the processor 120 and a preset output voltage, and thus may adjust an input voltage corresponding to the intermediate voltage into the output voltage.

Figure 6:
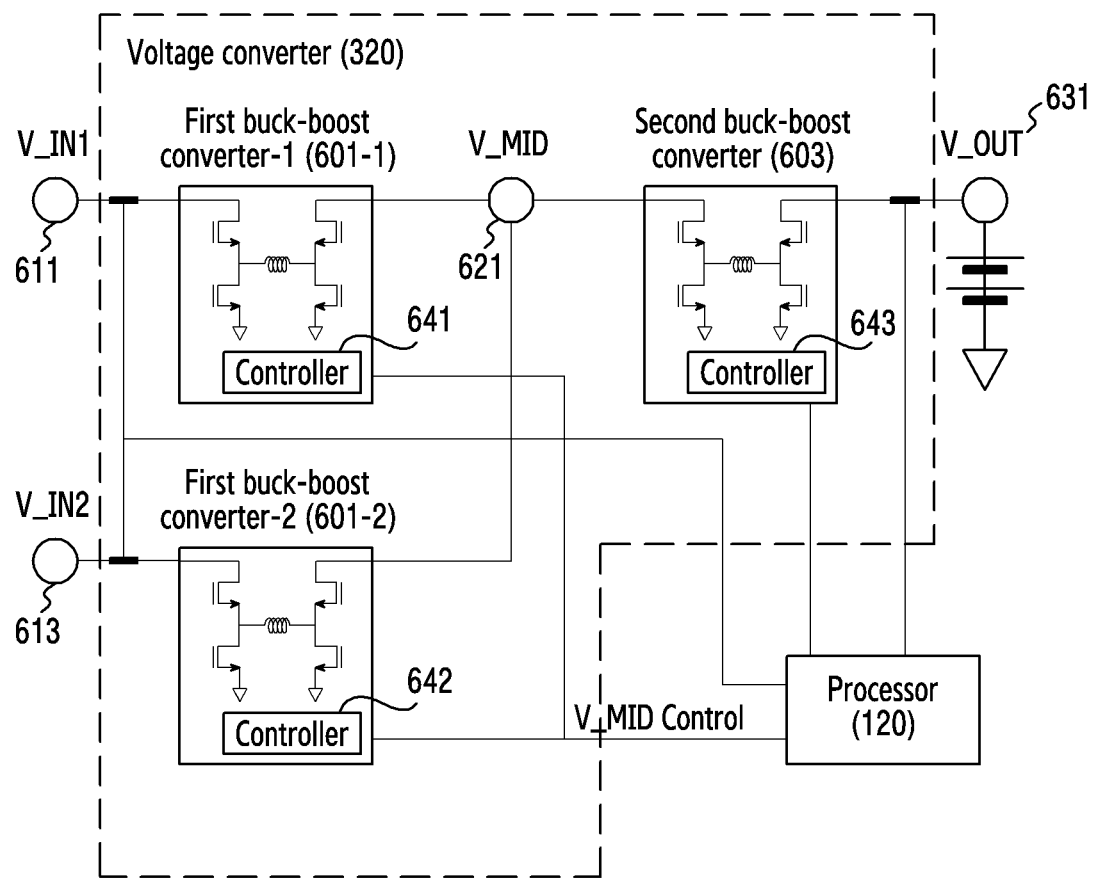
FIG. 6 illustrates a detailed configuration of a voltage converter 320 and a connection structure between the voltage converter 320 and a processor 120 according to various embodiments.

FIG. 6 illustrates a detailed configuration of a voltage converter 320 and a connection structure between the voltage converter 320 and a processor 120 according to various embodiments. The voltage converter 320 of FIG. 6 may be the voltage converter 320 illustrated in FIG. 3, and the processor 120 of FIG. 6 may be the processor 120 of FIG. 1 or the processor 120 of FIG. 3. FIG. 6 illustrates a case in which the voltage converter 320 includes two first buck-boost converters 601-1 and 601-2, but this configuration is only an example, and thus the disclosure is not limited thereto. For example, the voltage converter 320 may include at least two first buck-boost converters as illustrated in FIG. 5.

Referring to FIG. 6, the voltage converter 320 may include a first buck-boost converter-1 601-1, a first buck-boost converter-2 601-2, and a second buck-boost converter 603. The first buck-boost converter-1 601-1 and the first buck-boost converter-2 601-2 may be connected in parallel to each other, and each of the first buck-boost converter-1 601-1 and the first buck-boost converter-2 601-2 may be connected in series with the second buck-boost converter 603.

According to various embodiments, the first buck-boost converter-1 601-1 may receive a first input voltage V_IN1 611, and may convert the first input voltage V_IN1 611 into an intermediate voltage V_MID 621 under the control of a controller 641. For example, the controller 641 included in the first buck-boost converter-1 601-1 may acquire information on the intermediate voltage V_MID 621 from the processor 120, may adjust an on/off time of at least one transistor included in the first buck-boost converter-1 601-1 based on the acquired information, and thus may control such that the first input voltage V_IN1 611 is converted into the corresponding intermediate voltage V_MID 621. According to an embodiment, the controller 641 may acquire only information on an intermediate voltage from the processor 120, and may acquire the information on the intermediate voltage together with information on an operating mode of the first buck-boost converter-1 601-1. When the controller 641 acquires only information on an intermediate voltage from the processor 120, the controller 641 may determine an operating mode of the first buck-boost converter-1 601-1 based on the information on the intermediate voltage. For example, the controller 641 may analyze the information on the intermediate voltage provided by the processor 120, and when the intermediate voltage V_MID 621 that the first buck-boost converter-1 601-1 should output is higher than the first input voltage V_IN1 611, may determine that an operating mode of the first buck-boost converter-1 601-1 is a boost mode. As another example, when the intermediate voltage V_MID 621 that the first buck-boost converter-1 601-1 should output is lower than the first input voltage V_IN1 611, the controller 641 may determine that an operating mode of the first buck-boost converter-1 601-1 is a buck mode. As still another example, when the intermediate voltage V_MID 621 that the first buck-boost converter-1 601-1 should output is equal to the first input voltage V_IN1 611, the controller 641 may determine that an operating mode of the first buck-boost converter-1 601-1 is a buck-boost mode. According to an embodiment, when a first external power supply apparatus corresponding to the first input voltage V_IN1 611 is connected to the electronic device 101, the controller 641 may receive, from the processor 120, a signal including information on an intermediate voltage, and may operate based on the received signal.

According to various embodiments, the first buck-boost converter-2 601-2 may receive a second input voltage V_IN2 613, and may convert the second input voltage V_IN2 613 into an intermediate voltage V_MID 621 under the control of the controller 642. For example, the controller 642 included in the first buck-boost converter-2 601-2 may acquire information on the intermediate voltage V_MID 621 from the processor 120, may adjust an on/off time of at least one transistor included in the first buck-boost converter-2 601-2 based on the acquired information, and thus may control such that the second input voltage V_IN2 613 is converted into the corresponding intermediate voltage V_MID 621. An operating scheme of the first buck-boost converter-2 601-2 may be identical to that of the above-described the first buck-boost converter-1 601-1.

According to various embodiments, the second buck-boost converter 603 may receive an intermediate voltage V_MID 621 as an input voltage, and may convert the intermediate voltage V_MID 621 into a preset output voltage V_OUT 631 under the control of a controller 643. For example, the controller 643 included in the second buck-boost converter 603 may acquire information on the intermediate voltage V_MID 621 from the processor 120, may adjust an on/off time of at least one transistor included in the second buck-boost converter 603 based on the acquired information, and thus may control such that the intermediate voltage V_MID 621 is converted into the preset output voltage V_OUT 631. According to an embodiment, the controller 643 may acquire only information on an intermediate voltage from the processor 120, or may acquire the information on the intermediate voltage together with information on an operating mode of the second buck-boost converter 603. When the controller 643 acquires only information on an intermediate voltage from the processor 120, the controller 643 may determine an operating mode of the second buck-boost converter 603 based on the information on the intermediate voltage. For example, the controller 643 may analyze the information on the intermediate voltage provided by the processor 120, and when the intermediate voltage V_MID 621 input to the second buck-boost converter 603 is higher than the output voltage V_OUT 631, may determine that an operating mode of the second buck-boost converter 603 is a buck mode. As another example, when the intermediate voltage V_MID 621 input to the second buck-boost converter 603 is lower than the output voltage V_OUT 631, the controller 643 may determine that an operating mode of the second buck-boost converter 603 is a boost mode. As still another example, when the intermediate voltage V_MID 621 input to the second buck-boost converter 603 is equal to the output voltage V_OUT 631, the controller 643 may determine that an operating mode of the second buck-boost converter 603 is a buck-boost mode. According to an embodiment, when at least one of a first external power supply apparatus corresponding to the first input voltage V_IN1 611 and/or a second external power supply apparatus corresponding to the second input voltage V_IN2 613 is connected to the electronic device 101, the controller 643 may receive, from the processor 120, a signal including information on an intermediate voltage, and may operate based on the received signal.

According to various embodiments, the processor 120 may measure at least one of at least one input voltage, at least one input current, an output voltage, and an output current of the voltage converter 320, and may determine the intermediate voltage V_MID 621 based on the measured values. According to an embodiment, when an external power supply apparatus is detected to be connected to the electronic device 101, the processor 120 may measure at least one of at least one input voltage, at least one input current, an output voltage, and an output current of the voltage converter 320. The processor 120 may provide information on the determined intermediate voltage to the at least one buck-boost converter 601-1, 601-2, and 603 included in the voltage converter 320. The processor 120 may provide information on an intermediate voltage to at least one of the first buck-boost converters 601-1 and 601-2 based on a measurement result of an input voltage and/or an input current of the voltage converter 320. For example, when the first input voltage V_IN1 611 is detected but the second input voltage V_IN2 613 is not detected, the processor 120 may provide information on an intermediate voltage to the first buck-boost converter-1 601-1. As another example, when both the first input voltage V_IN1 611 and the second input voltage V_IN2 613 are detected, the processor 120 may provide information on an intermediate voltage to the first buck-boost converter-1 601-1 and the second buck-boost converter-2 601-2. As still another example, when an intermediate voltage is determined by detection of a connection between the electronic device 101 and an external power supply apparatus, the processor 120 may provide information on the intermediate voltage to the second buck-boost converter 603.

According to various embodiments, when at least one of input power or output power of the voltage converter 320 is changed while the voltage converter 320 performs a voltage conversion operation, the processor 120 may change an intermediate voltage of the voltage converter 320. According to an embodiment, while the voltage converter 320 operates according to the determined intermediate voltage, the processor 120 may periodically measure at least one of input power or output power of the voltage converter 320, and thus may detect whether at least one of the input power or output power thereof is changed. For example, the processor 120 may detect whether an input voltage is changed by an external power supply apparatus, or whether an input/output current is changed over time, and thus may change an intermediate voltage of the voltage converter 320 based on the changed input voltage or the changed input/output current. The processor 120 may search for an intermediate voltage corresponding to the changed input voltage, a preset output voltage, and an input/output current in an intermediate-voltage table stored in the memory 130. When an intermediate voltage corresponding to the changed input voltage, a preset output voltage, and an input/output current is searched in the intermediate-voltage table, the processor 120 may change an intermediate voltage of the voltage converter 320 to the searched intermediate voltage. When an intermediate voltage corresponding to the changed input voltage, a preset output voltage, and an input/output current is not searched in the intermediate-voltage table, the processor 120 may search for an intermediate voltage having optimal power efficiency by using a scheme in which the processor 120 measures power efficiency while boosting or dropping an intermediate voltage of the voltage converter 320 by a preset value.

Figure 7:
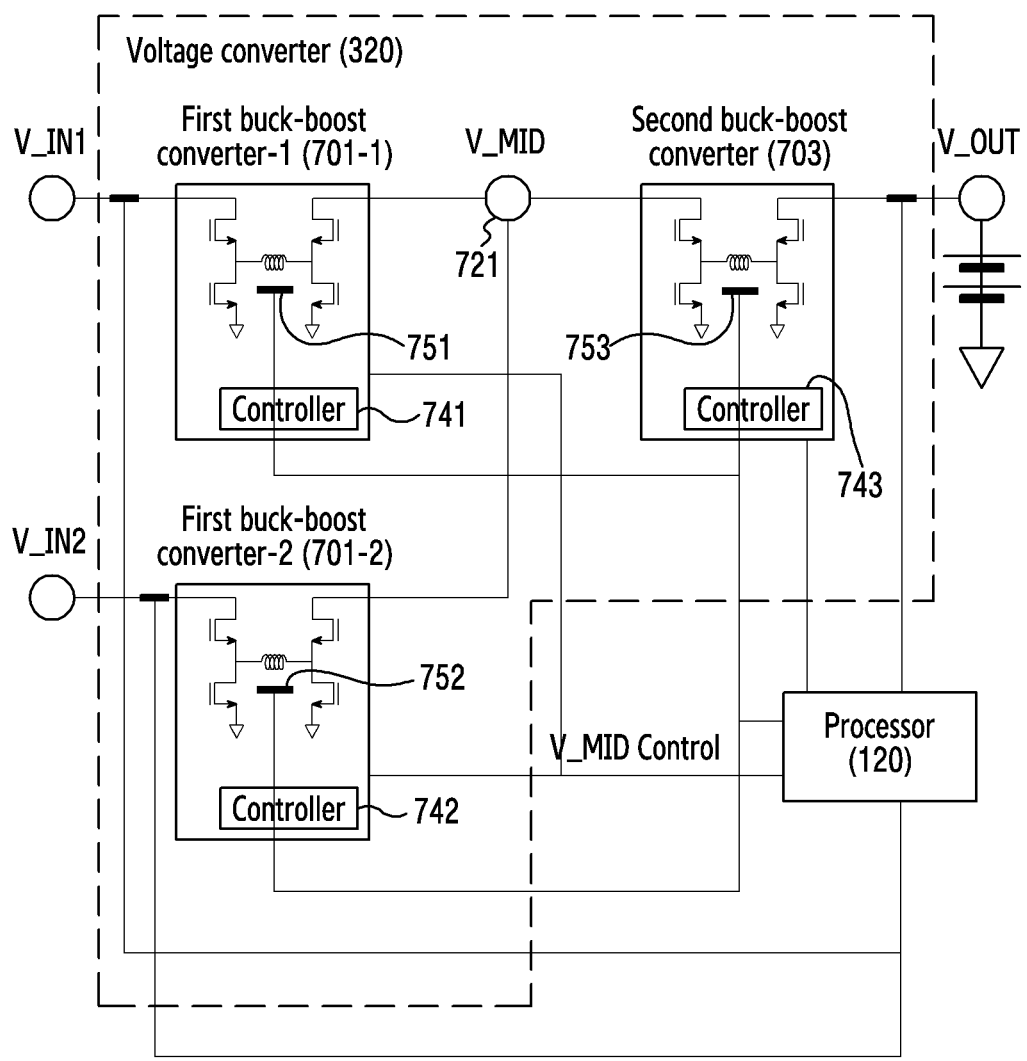
FIG. 7 illustrates a detailed configuration of the voltage converter 320 and a connection structure between the voltage converter 320 and the processor 120 according to various embodiments.

FIG. 7 illustrates a detailed configuration of the voltage converter 320 and a connection structure between the voltage converter 320 and the processor 120 according to various embodiments. The voltage converter 320 of FIG. 7 may be the voltage converter 320 illustrated in FIG. 3, and the processor 120 of FIG. 7 may be the processor 120 of FIG. 1 or the processor 120 of FIG. 3. FIG. 7 illustrates a case in which the voltage converter 320 includes two first buck-boost converters 701-1 and 701-2, but this configuration is only an example, and the disclosure is not limited thereto. For example, the voltage converter 320 may include at least two first buck-boost converters as illustrated in FIG. 5.

Referring to FIG. 7, the voltage converter 320 may include a first buck-boost converter-1 701-1, a first buck-boost converter-2 701-2, and a second buck-boost converter 703. The first buck-boost converter-1 701-1 and the first buck-boost converter-2 701-2 may be connected in parallel to each other, and each of the first buck-boost converter-1 701-1 and the first buck-boost converter-2 701-2 may be connected in series with the second buck-boost converter 703.

According to various embodiments, the voltage converter 320 may include the first buck-boost converter-1 701-1, the first buck-boost converter-2 701-2, the second buck-boost converter 703, and temperature sensors 751, 752, and 753. The first buck-boost converter-1 701-1 and the first buck-boost converter-2 701-2 may be connected in parallel to each other, and each of the first buck-boost converter-1 701-1 and the first buck-boost converter-2 701-2 may be connected in series with the second buck-boost converter 703. According to an embodiment, a configuration and an operation of each of the first buck-boost converter-1 701-1, the first buck-boost converter-2 701-2, and the second buck-boost converter 703 may be the same as described with reference to FIG. 6.

According to various embodiments, each of the temperature sensors 751, 752, and 753 may measure a temperature of an entirety of a corresponding buck-boost converter or at least one element of the corresponding buck-boost converter. For example, the first temperature sensor 751 may measure a temperature of the entirety of the first buck-boost converter-1 701-1 or a temperature of an inductor included in the first buck-boost converter-1 701-1. Each of the temperature sensors 751, 752, and 753 may provide the processor 120 with temperature information indicating the measured temperature value.

According to various embodiments, the processor 120 may perform the same operation as the processor 120 described with reference to FIG. 6. According to various embodiments, the processor 120 may receive, from the temperature sensors 751, 752, and 753, respective pieces of temperature information on the plurality of buck-boost converters 701-1, 701-2, and 703, and may change an intermediate voltage V_MID 721 based on the received temperature information. For example, in order to prevent overheating of a particular buck-boost converter among the plurality of buck-boost converters 701-1, 701-2, and 703 included in the voltage converter 320, the processor 120 may change an intermediate voltage based on a temperature of each of the plurality of buck-boost converters 701-1, 701-2, and 703. According to an embodiment, the processor 120 may check whether each of the plurality of buck-boost converters 701-1, 701-2, and 703 has a temperature satisfying a reference condition. The processor 120 may change an intermediate voltage so that an operating mode of the at least one buck-boost converter satisfying the reference condition can be changed. For example, when at least one buck-boost converter among the plurality of buck-boost converters 701-1, 701-2, and 703 has a temperature higher than a first threshold temperature, the processor 120 may change an intermediate voltage so that an operating mode of the buck-boost converter having the temperature higher than the first threshold temperature can be changed. For example, when a temperature of the second buck-boost converter 703 is measured to be higher than the first threshold temperature in a state in which the second buck-boost converter 703 is operating in a buck-boost mode, the processor 120 may change a value of an intermediate voltage from a first value to a second value so that an operating mode of the second buck-boost converter 703 can be changed to a buck mode or a boost mode. According to an embodiment, when a buck-boost converter, which is operating in an operating mode changed according to an intermediate voltage changed based on a temperature, has a temperature lower than a second threshold temperature, the processor 120 may re-change the changed intermediate voltage to another value, or may change the changed intermediate voltage to a previous value. The previous value may refer to an intermediate voltage which has optimal power efficiency and is configured by an intermediate-voltage table. The second threshold temperature may be lower than the first threshold temperature. For example, in a state in which the second buck-boost converter 703 is operating in a buck-boost mode, after a temperature of the second buck-boost converter 703 is measured to be higher than the first threshold temperature and an operating mode of the second buck-boost converter 703 is changed from the buck-boost mode to a buck mode, when a temperature of the second buck-boost converter 703 is measured to be lower than the second threshold temperature, the processor 120 allows an intermediate voltage to return to the previous value so that an operating mode of the second buck-boost converter 703 can return to the buck-boost mode.

As described above, an example in which one temperature sensor measures a temperature of one buck-boost converter has been described with reference to FIG. 7. However, according to various embodiments, a temperature of one buck-boost converter may be measured using a plurality of temperature sensors. For example, the plurality of temperature sensors may measure respective temperatures of a plurality of elements (e.g., transistors and an inductor) constituting one buck-boost converter, respectively, and the processor 120 may control an operating mode of a corresponding buck-boost converter based on an average value of the temperatures measured by the plurality of temperature sensors.

According to various embodiments, an electronic device may include: at least one first converter (e.g., the first buck-boost converter 322 of FIG. 3) configured to support a plurality of operating modes for changing a voltage; a second converter (e.g., the second buck-boost converter 324 of FIG. 3) configured to support the plurality of operating modes and be connected in series with the at least one first converter; and at least one processor (e.g., the processor 120 of FIG. 3), wherein the processor is configured to: determine an intermediate voltage between the at least one first converter and the second converter based on an input voltage of the at least one first converter and an output voltage of the second converter; and control an operating mode of each of the at least one first converter and the second converter based on the determined intermediate voltage.

According to various embodiments, the processor may be configured to determine the intermediate voltage further based on at least one of an input current of the first converter or an output current of the second converter.

According to various embodiments, the processor may be configured to determine the intermediate voltage further based on at least one of power efficiency or a temperature of each of the at least one first converter and the second converter.

According to various embodiments, the electronic device may further include at least one temperature sensor configured to measure a temperature of the at least one first converter and a temperature of the second converter, wherein the processor is configured to change the intermediate voltage between the at least one first converter and the second converter based on at least one of the temperature of the at least one first converter or the temperature of the second converter, which has been measured using the at least one temperature sensor.

According to various embodiments, the processor may be configured to change the intermediate voltage so as to change an operating mode of at least one converter satisfying a designated temperature condition among the at least one first converter and the second converter.

According to various embodiments, the at least one temperature sensor may be configured to measure a temperature of an inductor included in each of the at least one first converter and the second converter.

According to various embodiments, the processor may be configured to: detect a change in at least one of input power of the first converter or output power of the second converter; and change the intermediate voltage between the at least one first converter and the second converter in response to detection of the change.

According to various embodiments, the processor may be configured to: determine an operating mode of the at least one first converter based on the input voltage of the at least one first converter and the determined intermediate voltage; and determine an operating mode of the second converter based on the determined intermediate voltage and the output voltage of the second converter.

According to various embodiments, the at least one first converter may be configured to convert the input voltage into the intermediate voltage and output the converted intermediate voltage, and the second converter may be configured to receive the intermediate voltage output from the at least one first converter and convert the received intermediate voltage into the output voltage.

According to various embodiments, when the number of the at least one first converter is plural, the plurality of first converters may be configured to be connected in parallel and receive input voltages from different external power supply apparatuses.

According to various embodiments, the plurality of operating modes for changing the voltage may include at least one of a buck mode for dropping a voltage, a boost mode for boosting a voltage, or a buck-boost mode for repeatedly dropping and boosting a voltage.

According to various embodiments, an electronic device may include: at least one first buck-boost converter configured to be capable of dropping or boosting a voltage; a second buck-boost converter configured to be connected in series with the at least one first buck-boost converter and be capable of dropping or boosting a voltage; and at least one processor, wherein the processor is configured to: determine an intermediate voltage between the at least one first buck-boost converter and the second buck-boost converter based on an input voltage of the at least one first buck-boost converter and an output voltage of the second buck-boost converter; and control each of the at least one first buck-boost converter and the second buck-boost converter to drop or boost a voltage, based on the determined intermediate voltage.

According to various embodiments, the processor may be configured to determine the intermediate voltage further based on at least one of power efficiency or a temperature of each of the at least one first buck-boost converter and the second buck-boost converter.

According to various embodiments, the processor may be configured to determine the intermediate voltage further based on at least one of an input current of the at least one first buck-boost converter or an output current of the at least one second buck-boost converter.

According to various embodiments, the electronic device may further include at least one temperature sensor configured to measure a temperature of the at least one first buck-boost converter and a temperature of the second buck-boost converter, wherein the processor is configured to change the intermediate voltage between the at least one first buck-boost converter and the second buck-boost converter based on at least one of the temperature of the at least one first buck-boost converter or the temperature of the second buck-boost converter, which has been measured using the at least one temperature sensor.

According to various embodiments, the processor may be configured to change the intermediate voltage so as to change an operating mode of at least one buck-boost converter satisfying a designated temperature condition among the at least one first buck-boost converter and the second buck-boost converter.

According to various embodiments, the at least one temperature sensor may be configured to measure a temperature of an inductor included in each of the at least one first buck-boost converter and the second buck-boost converter.

According to various embodiments, the processor may be configured to: detect a change in at least one of input power of the first buck-boost converter or output power of the second buck-boost converter; and change the intermediate voltage between the at least one first buck-boost converter and the second buck-boost converter in response to detection of the change.

Figure 8:
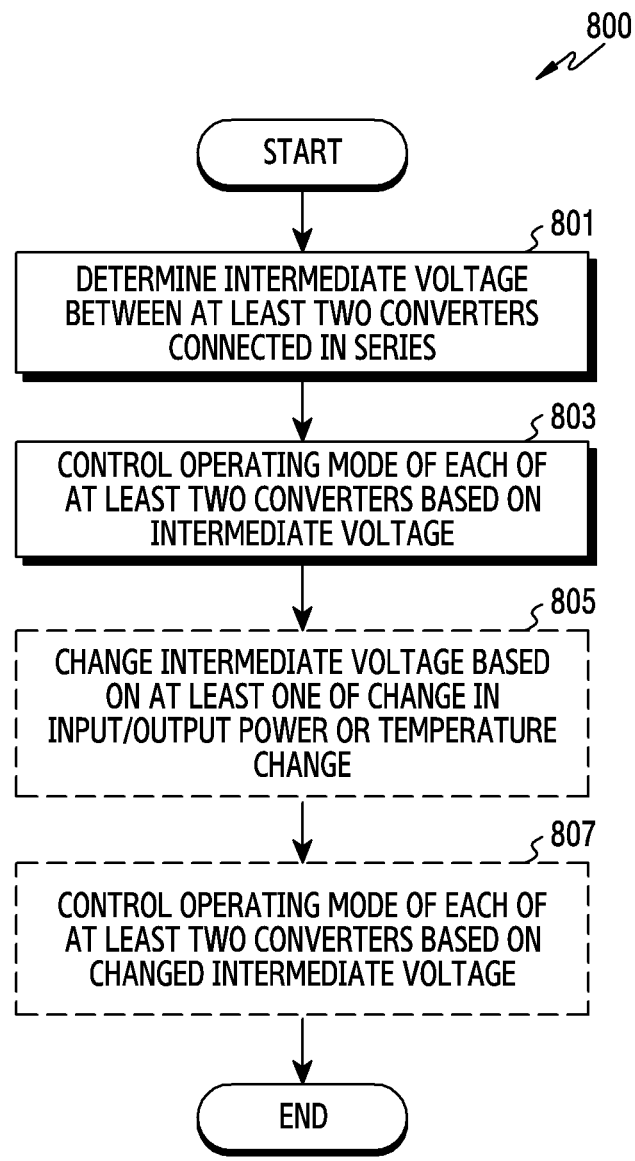
FIG. 8 is a flowchart 800 illustrating a flow of controlling operations of buck-boost converters in order to adjust a voltage in an electronic device according to various embodiments.

FIG. 8 is a flowchart 800 illustrating a flow of controlling operations of buck-boost converters in order to adjust a voltage in an electronic device according to various embodiments. In the following embodiments, respective operations may be performed sequentially, but do not have to be performed sequentially. For example, the order of execution of the operations may be changed, and at least two operations may be performed in parallel. In FIG. 8, an operation indicated by a dotted line may be omitted according to an embodiment. In this example, the electronic device may be the electronic device 101 of FIG. 1 or the electronic device 101 of FIG. 3. In the following description, a converter may refer to a buck-boost converter capable of operating in a buck mode for dropping an input voltage, a boost mode for boosting an input voltage, and/or a buck-boost mode for maintaining and outputting an input voltage.

According to various embodiments, in operation 801, the electronic device may determine an intermediate voltage between at least two converters connected in series with each other. According to an embodiment, a processor (e.g., the processor 120 of FIG. 3) of the electronic device may measure at least one of an input voltage, an output voltage, an input current, or an output current of a voltage converter (e.g., the voltage converter 320 of FIG. 3), and may determine an intermediate voltage between at least two converters (e.g., the first buck-boost converter 322 and the second buck-boost converter 324 of FIG. 3) included in the voltage converter 320 based on the measured value. When at least one external power supply apparatus is detected to be connected to the electronic device 101 via a connecting terminal (e.g., the connecting terminal 178 of FIG. 3), the processor 120 of the electronic device may determine an intermediate voltage of the voltage converter 320. According to an embodiment, the processor 120 of the electronic device may determine an intermediate voltage corresponding to at least one of the measured input voltage, output voltage, input current, or output current based on information (e.g., an intermediate-voltage table) pre-stored in a memory (e.g., the memory 130 of FIG. 3). At least one of an input voltage, an input current, or an output current may be changed by the external power supply apparatus connected to the electronic device 101. An output voltage is a voltage appropriate for charging the battery 189, and may have a fixed value.

According to various embodiments, in operation 803, the electronic device may control an operating mode of each of the at least two converters based on the intermediate voltage. According to an embodiment, the processor 120 of the electronic device may determine an operating mode of each of the at least two converters (e.g., the first buck-boost converter 322 and the second buck-boost converter 324) based on the input voltage, the intermediate voltage, and the output voltage, and may control such that each of the at least two converters operates based on the intermediate voltage and the determined operating mode. For example, when the intermediate voltage is equal to the input voltage and is lower than the output voltage, the processor 120 of the electronic device may determine that an operating mode of the first converter (e.g., the first buck-boost converter 322) is a buck-boost mode, and may determine that an operating mode of the second converter (e.g., the second buck-boost converter 324) is a boost mode. As another example, when the intermediate voltage is higher than the input voltage and is equal to the output voltage, the processor 120 of the electronic device may determine that an operating mode of the first converter (e.g., the first buck-boost converter 322) is a boost mode, and may determine that an operating mode of the second converter (e.g., the second buck-boost converter 324) is a buck-boost mode. According to an embodiment, the processor 120 of the electronic device may provide information on the determined intermediate voltage and operating mode to the at least two converters (e.g., the first buck-boost converter 322 and the second buck-boost converter 324) included in the voltage converter 320. Each of the at least two converters (e.g., the first buck-boost converter 322 and the second buck-boost converter 324) included in the voltage converter 320 may operate according to the intermediate voltage and the corresponding operating mode. For example, the first converter (e.g., the first buck-boost converter 322) may adjust an on/off time of at least one transistor included in the first converter based on the input voltage, the intermediate voltage, and/or the operating mode, and thus may convert the input voltage into the intermediate voltage. As another example, the second converter (e.g., the second buck-boost converter 324) may adjust an on/off time of at least one transistor included in the second converter based on the intermediate voltage, the output voltage, and/or the operating mode, and thus may convert an input intermediate voltage into the output voltage.

According to various embodiments, in operation 805, the electronic device may change an intermediate voltage based on at least one of a change in input/output power or a temperature change. According to an embodiment, the processor 120 of the electronic device may change an intermediate voltage based on a change in input power and/or output power of the voltage converter 320. For example, when a change in input power and/or output power is detected, the processor 120 of the electronic device may measure power efficiency while changing (dropping or boosting) an intermediate voltage by a predetermined value, and may select an intermediate voltage having optimal power efficiency. An operation related to this configuration will be described in more detail below with reference to FIG. 9. According to an embodiment, the processor 120 of the electronic device may change an intermediate voltage based on a temperature change of each of the at least two converters (e.g., the first buck-boost converter 322 and the second buck-boost converter 324). For example, the processor 120 of the electronic device may change an intermediate voltage based on whether each of the at least two converters (e.g., the first buck-boost converter 322 and the second buck-boost converter 324) has a temperature satisfying a designated condition. For example, the processor 120 of the electronic device may compare a temperature of each of the at least two converters (e.g., the first buck-boost converter 322 and the second buck-boost converter 324) with a first threshold temperature, and may determine whether there is a converter having a temperature higher than the first threshold temperature among the at least two converters. If there is a converter having a temperature higher than the first threshold temperature, the processor 120 of the electronic device may change an intermediate voltage so that an operating mode of the corresponding converter can be changed. For example, when a temperature of the first converter (e.g., the first buck-boost converter 322) is measured to be higher than the first threshold temperature in a state in which the first converter is operating in a buck-boost mode, the processor 120 of the electronic device may change a value of an intermediate voltage from a first value to a second value so that an operating mode of the first converter can be changed to a buck mode or a boost mode. An operation related to this configuration will be described in more detail below with reference to FIG. 10.

According to various embodiments, in operation 807, the electronic device may control an operating mode of each of the at least two converters based on the changed intermediate voltage. According to an embodiment, the processor 120 of the electronic device may determine an operating mode of each of the at least two converters (e.g., the first buck-boost converter 322 and the second buck-boost converter 324) based on the input voltage, the changed intermediate voltage, and the output voltage, and may control such that each of the at least two converters operates based on the changed intermediate voltage and the determined operating mode. For example, when the changed intermediate voltage is equal to the input voltage and is lower than the output voltage, the processor 120 of the electronic device may determine that an operating mode of the first converter (e.g., the first buck-boost converter 322) is a buck-boost mode, and may determine that an operating mode of the second converter (e.g., the second buck-boost converter 324) is a boost mode. As another example, when the changed intermediate voltage is higher than the input voltage and is equal to the output voltage, the processor 120 of the electronic device may determine that an operating mode of the first converter (e.g., the first buck-boost converter 322) is a boost mode, and may determine that an operating mode of the second converter (e.g., the second buck-boost converter 324) is a buck-boost mode. According to an embodiment, the processor 120 of the electronic device may provide information on the changed intermediate voltage and operating mode to the at least two converters (e.g., the first buck-boost converter 322 and the second buck-boost converter 324) included in the voltage converter 320. Each of the at least two converters (e.g., the first buck-boost converter 322 and the second buck-boost converter 324) included in the voltage converter 320 may operate according to the changed intermediate voltage and the corresponding operating mode.

Figure 9:
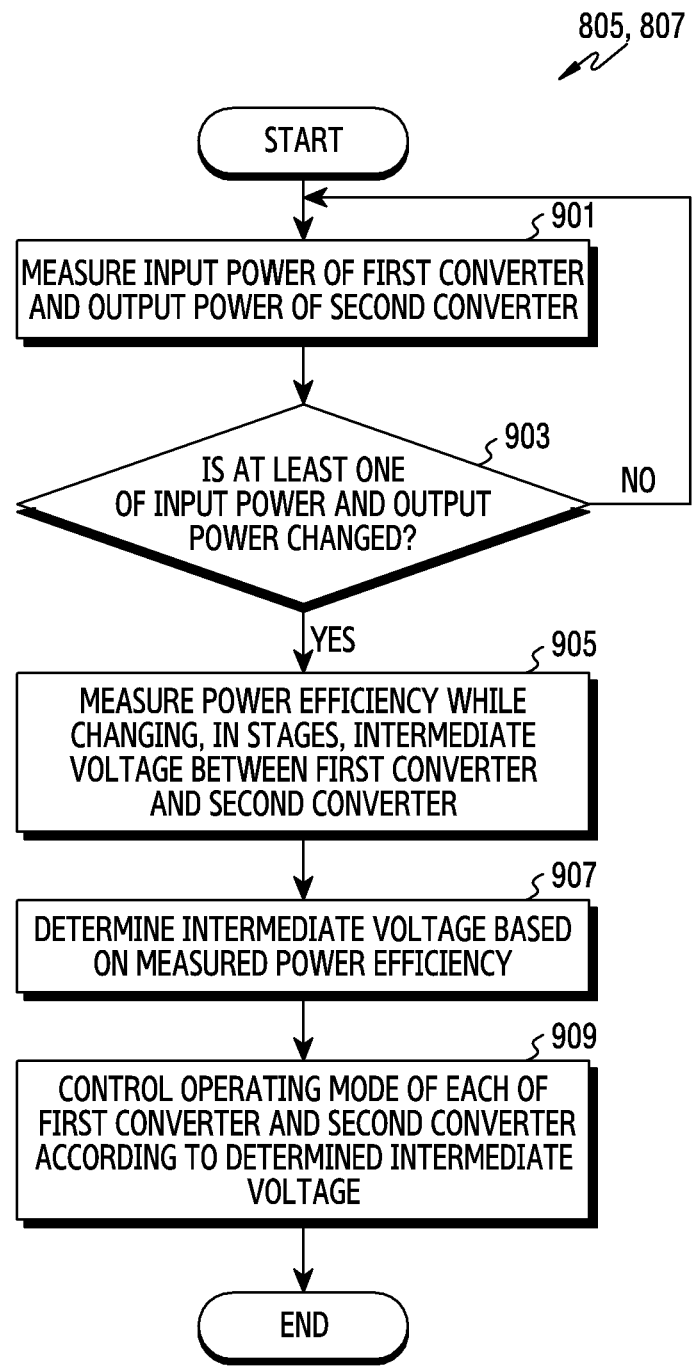
FIG. 9 is a flowchart 805 and 807 illustrating a flow of controlling operations of buck-boost converters based on a change in input/output power in an electronic device according to various embodiments.

FIG. 9 is a flowchart 805 and 807 illustrating a flow of controlling operations of buck-boost converters based on a change in input/output power in an electronic device according to various embodiments. Operations described below with reference to FIG. 9 may be at least a part of operation 805 and operation 807 of FIG. 8. In the following embodiments, respective operations may be performed sequentially, but do not have to be performed sequentially. For example, the order of execution of the operations may be changed, and at least two operations may be performed in parallel. In this example, the electronic device may be the electronic device 101 of FIG. 1 or the electronic device 101 of FIG. 3. In the following description, a converter may refer to a buck-boost converter capable of operating in a buck mode for dropping an input voltage, a boost mode for boosting an input voltage, and/or a buck-boost mode for maintaining and outputting an input voltage. Hereinafter, for convenience of description, a description will be made on the assumption that a first converter is a first buck-boost converter 322 configured to receive an input voltage from an external power supply apparatus and a second converter is a second buck-boost converter 324 configured to be connected in series with the first converter and receive an intermediate voltage output from the first converter. However, the disclosure is not limited thereto.

According to various embodiments, in operation 901, the electronic device may measure input power of the first converter and output power of the second converter. According to an embodiment, when a connection to an external power supply apparatus is detected, the processor 120 of the electronic device may measure input power and output power of the voltage converter 320. Input power of the voltage converter 320 may be input power of the first converter (e.g., the first buck-boost converter 322), and output power of the voltage converter 320 may be output power of the second converter (e.g., the second buck-boost converter 324). According to an embodiment, the processor 120 of the electronic device may measure an input voltage, an input current, an output voltage, and an output current of the voltage converter 320, and may determine input power and output power of the voltage converter 320 based on the measured values.

According to various embodiments, in operation 903, the electronic device may determine whether at least one of input power and output power is changed. According to an embodiment, the processor 120 of the electronic device may determine whether an input voltage of the voltage converter 320 is changed so that input power thereof can be changed, or whether an output current of the voltage converter 320 is changed so that output power thereof can be changed. An input voltage of the voltage converter 320 may be changed according to a change in the type of external power supply apparatus connected to the electronic device 101 or a change in a voltage supplied from the external power supply apparatus connected to the electronic device 101. An output current of the voltage converter 320 may be reduced when the voltage converter 320 operates continuously for a predetermined time or longer.

According to various embodiments, in operation 905, the electronic device may measure power efficiency while changing, in stages, an intermediate voltage between the first converter and the second converter. According to an embodiment, the processor 120 of the electronic device may measure power efficiency while changing (dropping or boosting) an intermediate voltage of the voltage converter 320 by a predetermined value (or stage or level). For example, when a change in input power and/or output power is detected in a state in which an intermediate voltage is 6 volts, the processor 120 of the electronic device may control such that the voltage converter 320 changes an intermediate voltage from 6 volts to 7 volts and operates, and may calculate power efficiency by measuring input power and output power of the voltage converter 320. The processor 120 of the electronic device may control such that the voltage converter 320 sets an intermediate voltage from 7 volts to 8 volts and operates, and may calculate power efficiency by measuring input power and output power of the voltage converter 320.

According to various embodiments, in operation 907, the electronic device may determine an intermediate voltage based on the measured power efficiency. According to an embodiment, the processor 120 of the electronic device may select an intermediate voltage corresponding to the highest power efficiency among the measured power efficiencies, and may determine that the selected intermediate voltage is an intermediate voltage of the voltage converter 320. For example, when power efficiency is 97% for an intermediate voltage of 7 volts and power efficiency is 95% for an intermediate voltage of 8 volts, the processor 120 of the electronic device may determine that 7 volts is an intermediate voltage of the voltage converter 320.

According to various embodiments, in operation 909, the electronic device may control an operating mode of each of the first converter and the second converter according to the determined intermediate voltage. According to an embodiment, the processor 120 of the electronic device may determine an operating mode of each of the at least two converters (e.g., the first buck-boost converter 322 and the second buck-boost converter 324) based on the input voltage, the determined intermediate voltage, and the output voltage, and may control such that each of the at least two converters operate based on the changed intermediate voltage and the determined operating mode.

Figure 10:
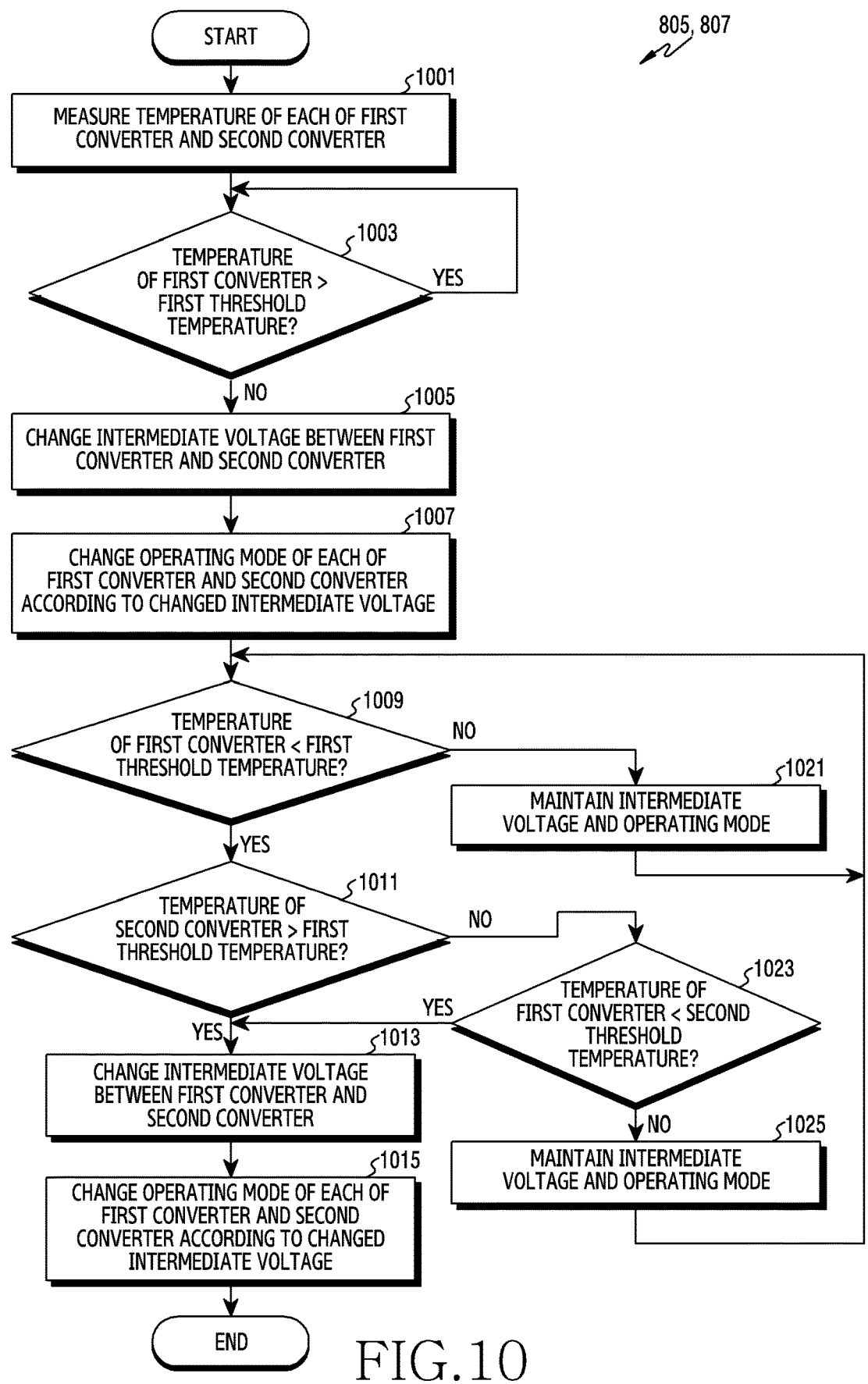
FIG. 10 is a flowchart 805 and 807 illustrating a flow of controlling operations of buck-boost converters based on a temperature change in an electronic device according to various embodiments.

FIG. 10 is a flowchart 805 and 807 illustrating a flow of controlling operations of buck-boost converters based on a temperature change in an electronic device according to various embodiments. Operations described below with reference to FIG. 10 may be at least a part of operation 805 and operation 807 of FIG. 8. In the following embodiments, respective operations may be performed sequentially, but do not have to be performed sequentially. For example, the order of execution of the operations may be changed, and at least two operations may be performed in parallel. In this example, the electronic device may be the electronic device 101 of FIG. 1 or the electronic device 101 of FIG. 3. In the following description, a converter may refer to a buck-boost converter capable of operating in a buck mode for dropping an input voltage, a boost mode for boosting an input voltage, and/or a buck-boost mode for maintaining and outputting an input voltage. Hereinafter, when a first converter is a first buck-boost converter 322 configured to receive an input voltage from an external power supply apparatus, a second converter may be a second buck-boost converter 324 configured to be connected in series with the first converter and receive an intermediate voltage output from the first converter. However, the opposite scenario is also possible. For example, when the second converter is the first buck-boost converter 322 configured to receive an input voltage from an external power supply apparatus, the first converter may be the second buck-boost converter 324 configured to be connected in series with the second converter and receive an intermediate voltage output from the second converter.

According to various embodiments, in operation 1001, the electronic device may measure a temperature of each of the first converter and the second converter. According to an embodiment, the processor 120 of the electronic device may measure a temperature of each of the first converter and the second converter by using temperature sensors (e.g., the temperature sensors 751, 752, and 753). According to an embodiment, the processor 120 of the electronic device may measure a temperature of an inductor included in each of the first converter and the second converter by using temperature sensors (e.g., the temperature sensors 751, 752, and 753).

According to various embodiments, in operation 1003, the electronic device may determine whether the first converter has a temperature higher than a first threshold temperature. For example, the processor 120 of the electronic device may compare a temperature of the first converter with the first threshold temperature, and thus may determine whether the first converter has a temperature higher than the first threshold temperature. The first converter may be a converter configured to operate in a buck-boost mode. For example, the processor 120 of the electronic device may determine whether a first buck-boost converter, which operates in a buck-boost mode, has a temperature higher than the first threshold temperature. This configuration is only an example, and the disclosure is not limited thereto. For example, the first converter may be a converter configured to operate in a buck mode or a boost mode.

According to various embodiments, if the first converter has a temperature higher than the first threshold temperature, in operation 1005, the electronic device may change an intermediate voltage between the first converter and the second converter. According to an embodiment, if the first converter has a temperature higher than the first threshold temperature, the processor 120 of the electronic device may change an intermediate voltage between the first converter and the second converter in order to change an operating mode of the first converter. For example, when a temperature of the first converter is measured to be higher than the first threshold temperature in a state in which the first converter is operating in a buck-boost mode, the processor 120 of the electronic device may change an intermediate voltage between the first converter and the second converter so that the first converter can operate in a mode other than the buck-boost mode. According to an embodiment, the processor 120 of the electronic device may change a value of an intermediate voltage between the first converter and the second converter to a value which can be used to change an operating mode of the first converter.

According to various embodiments, in operation 1007, the electronic device may change an operating mode of each of the first converter and the second converter according to the changed intermediate voltage. For example, the processor 120 of the electronic device may control such that an operating mode of each of the first converter and the second converter is changed according to the changed intermediate voltage. For example, the processor 120 of the electronic device may change an operating mode of the first converter from a buck-boost mode to a buck mode, and may change an operating mode of the second converter from a buck mode to a buck-boost mode. According to an embodiment, only an operating mode of the first converter may be changed and an operating mode of the second converter may not be changed according to the changed intermediate voltage. For example, in a situation where the first converter operates in a buck-boost mode so as to output a first intermediate voltage and the second converter operates in a buck mode so as to convert the first intermediate voltage into an output voltage, when the changed intermediate voltage has a value greater than the first intermediate voltage, an operating mode of the first converter may be changed from the buck-boost mode to a boost mode, and an operating mode of the second converter may be maintained in a buck mode.

According to various embodiments, in operation 1009, the electronic device may determine whether the first converter has a temperature lower than the first threshold temperature. For example, the processor 120 of the electronic device may compare a temperature of the first converter with the first threshold temperature, and thus may determine whether the first converter has a temperature lower than the first threshold temperature. According to various embodiments, if the first converter has a temperature higher than or equal to the first threshold temperature, in operation 1021, the electronic device may maintain an intermediate voltage and an operating mode. For example, the processor 120 of the electronic device may maintain the intermediate voltage and the operating mode determined in operation 1005 and operation 1007, respectively.

According to various embodiments, if the first converter has a temperature lower than the first threshold temperature, in operation 1011, the electronic device may determine whether the second converter has a temperature higher than the first threshold temperature. For example, the processor 120 of the electronic device may compare a temperature of the second converter with the first threshold temperature, and thus may determine whether the second converter has a temperature higher than the first threshold temperature. If the second converter has a temperature higher than the first threshold temperature, the electronic device may perform operation 1013 described below.

According to various embodiments, if the second converter has a temperature lower than or equal to the first threshold temperature, in operation 1023, the electronic device may determine whether the first converter has a temperature lower than a second threshold temperature. According to various embodiments, if the first converter has a temperature higher than or equal to the second threshold temperature, in operation 1025, the electronic device may maintain an intermediate voltage and an operating mode. For example, the processor 120 of the electronic device may maintain the intermediate voltage and the operating mode determined in operation 1005 and operation 1007, respectively. According to various embodiments, if the first converter has a temperature lower than the second threshold temperature, the electronic device may perform operation 1013 described below.

According to various embodiments, in operation 1013, the electronic device may change an intermediate voltage between the first converter and the second converter. According to an embodiment, the processor 120 of the electronic device may change an intermediate voltage between the first converter and the second converter in order to change an operating mode of a converter satisfying a reference condition. For example, if the second converter has a temperature higher than the first threshold temperature, the processor 120 of the electronic device may change an intermediate voltage in order to change an operating mode of the second converter. For example, when a temperature of the second converter is measured to be higher than the first threshold temperature in a state in which the second converter is operating in a buck-boost mode, the processor 120 of the electronic device may change an intermediate voltage so that the first converter can operate in a mode other than a buck-boost mode. As another example, if the first converter has a temperature lower than the second threshold temperature, the processor 120 of the electronic device may change an intermediate voltage in order to change an operating mode of the first converter. For example, when a temperature of the first converter is measured to be lower than the second threshold temperature in a state in which the first converter is operating in a mode other than a buck-boost mode, the processor 120 of the electronic device may change an intermediate voltage so that the first converter can operate in a buck-boost mode.

According to various embodiments, in operation 1015, the electronic device may change an operating mode of each of the first converter and the second converter according to the changed intermediate voltage. For example, the processor 120 of the electronic device may control such that an operating mode of each of the first converter and the second converter is changed according to the changed intermediate voltage. This configuration may be the same as described in operation 1007.

Figure 11A:
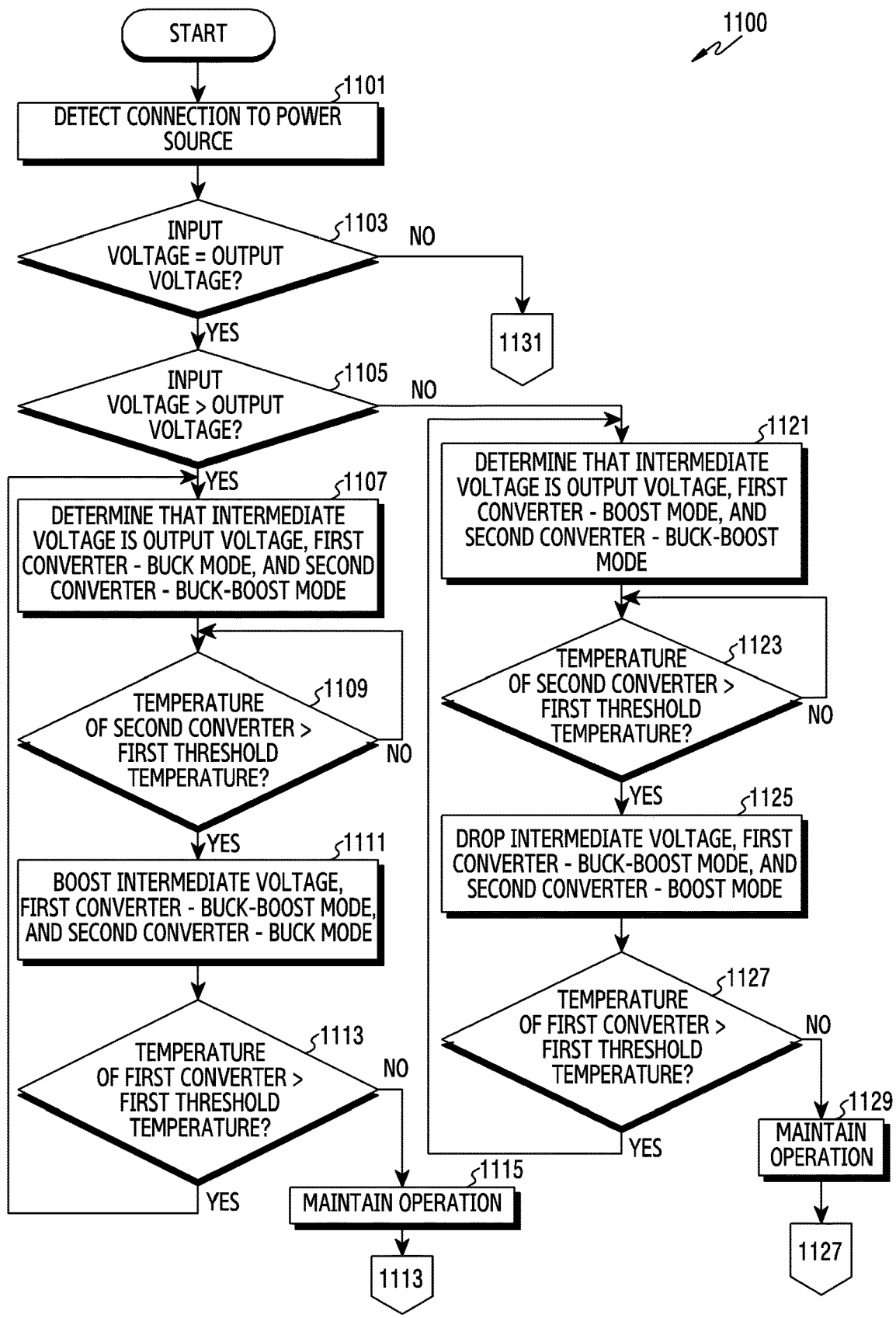
FIG. 11A and FIG. 11B are a flowchart 1100 and 1101 illustrating a detailed flow of controlling operations of buck-boost converters based on a temperature change in an electronic device according to various embodiments.
Figure 11B:
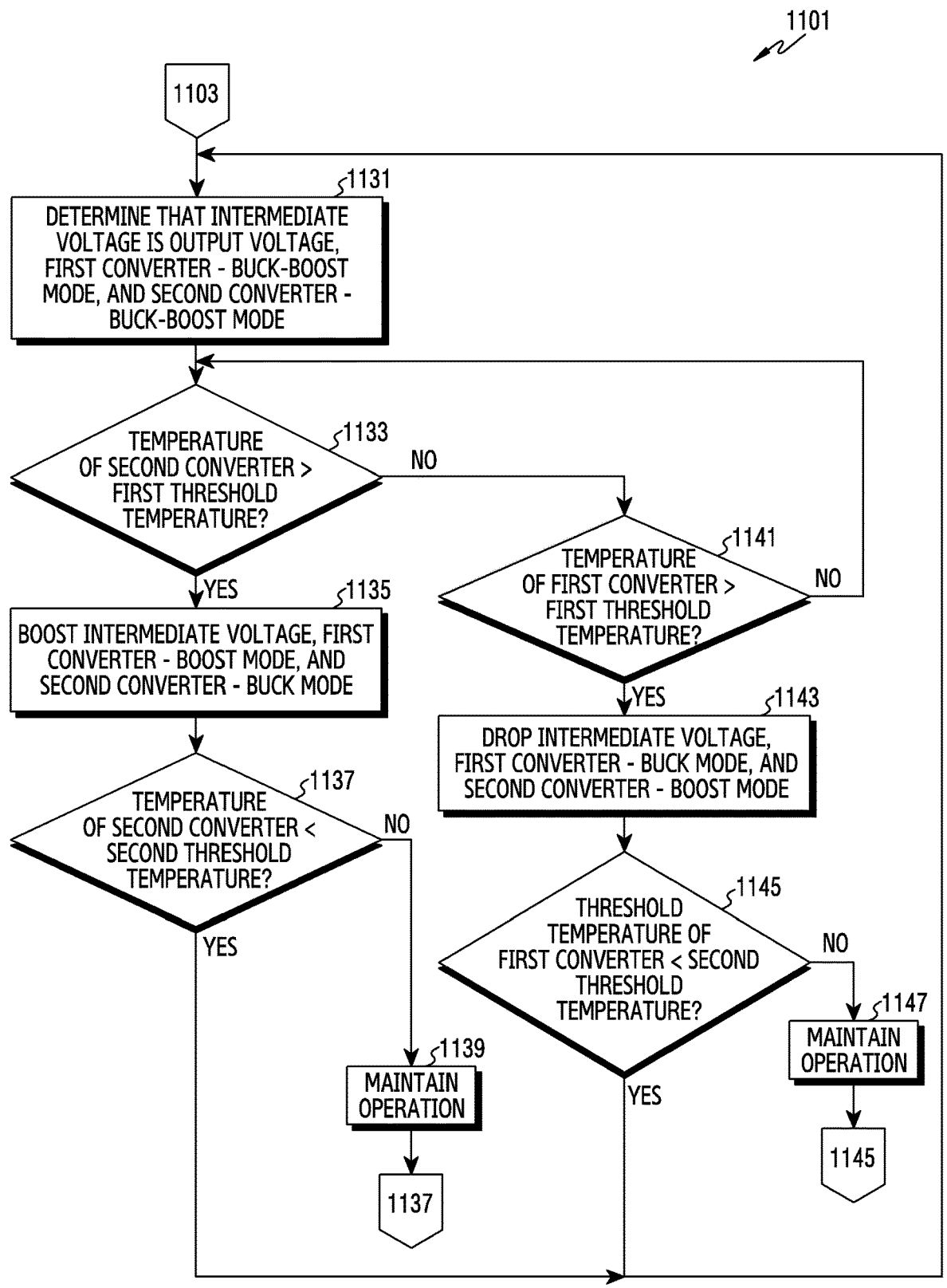

FIG. 11A and FIG. 11B are a flowchart 1100 and 1101 illustrating a detailed flow of controlling operations of buck-boost converters based on a temperature change in an electronic device according to various embodiments. Operations described below with reference to FIG. 11A and FIG. 11B may be at least some of the operations of FIG. 10. FIG. 11A and FIG. 11B illustrate exemplary operations for helping the understanding of the disclosure, and the disclosure is not limited thereto. In the following embodiments, respective operations may be performed sequentially, but do not have to be performed sequentially. For example, the order of execution of the operations may be changed, and at least two operations may be performed in parallel. In this example, the electronic device may be the electronic device 101 of FIG. 1 or the electronic device 101 of FIG. 3. In the following description, a converter may refer to a buck-boost converter capable of operating in a buck mode for dropping an input voltage, a boost mode for boosting an input voltage, and/or a buck-boost mode for maintaining and outputting an input voltage. Hereinafter, a description will be made on the assumption that a first converter is a first buck-boost converter 322 configured to receive an input voltage from an external power supply apparatus and a second converter is a second buck-boost converter 324 configured to be connected in series with the first converter and receive an intermediate voltage output from the first converter. However, the opposite scenario is also possible.

According to various embodiments, in operation 1101, the electronic device may detect a connection to a power source. According to an embodiment, the processor 120 of the electronic device may detect that an external power supply apparatus is connected to the electronic device 101 via the connecting terminal 178. According to an embodiment, the processor 120 of the electronic device may measure an input voltage of the voltage converter 320, and may detect that an external power supply apparatus is connected to the electronic device 101, based on the measured input voltage.

According to various embodiments, in operation 1103, the electronic device may determine whether an input voltage coincides with an output voltage. According to an embodiment, the processor 120 of the electronic device may measure an input voltage of the voltage converter 320, and may compare the measured input voltage with a preset output voltage. If the input voltage is equal to the output voltage, in operation 1105, the electronic device may determine whether the input voltage is higher than the output voltage.

According to various embodiments, if the input voltage is higher than the output voltage, in operation 1107, the electronic device may determine that an intermediate voltage is the output voltage, may operate the first converter in a buck mode, and may operate the second converter in a buck-boost mode. For example, when an input voltage is 20 volts and an output voltage is 8 volts, the processor 120 of the electronic device may determine that an intermediate voltage is 8 volts identical to the value of the output voltage, and thus may operate the first converter in a buck mode and operate the second converter in a buck-boost mode.

According to various embodiments, in operation 1109, the electronic device may determine whether the second converter has a temperature higher than a first threshold temperature. If the second converter has a temperature lower than or equal to the first threshold temperature, the electronic device may maintain a present operation. For example, the processor 120 of the electronic device may maintain a present operating state so that each of the first converter and the second converter can operate according to the intermediate voltage and the operating mode determined in operation 1107.

According to various embodiments, if the second converter has a temperature higher than the first threshold temperature, in operation 1111, the electronic device may boost the intermediate voltage, may operate the first converter in a buck-boost mode, and may operate the second converter in a buck mode. For example, when an input voltage is 20 volts, an output voltage is 8 volts, and an intermediate voltage is 8 volts, the processor 120 of the electronic device may boost the intermediate voltage of 8 volts to 20 volts, and thus may operate the first converter in a buck-boost mode and operate the second converter in a buck mode.

According to various embodiments, in operation 1113, the electronic device may determine whether the first converter has a temperature higher than the first threshold temperature. If the first converter has a temperature lower than or equal to the first threshold temperature, in operation 1115, the electronic device may maintain a present operating mode. For example, the processor 120 of the electronic device may maintain a present operating state so that each of the first converter and the second converter can operate according to the intermediate voltage and the operating mode determined in operation 1111. If the first converter has a temperature higher than the first threshold temperature, the electronic device may perform operation 1107.

According to various embodiments, when a result of execution of operation 1105 shows that the input voltage is lower than the output voltage, in operation 1121, the electronic device may determine that an intermediate voltage is the output voltage, may operate the first converter in a boost mode, and may operate the second converter in a buck-boost mode. For example, when an input voltage is 5 volts and an output voltage is 8 volts, the processor 120 of the electronic device may determine that an intermediate voltage is 8 volts identical to the value of the output voltage, and thus may operate the first converter in a boost mode and operate the second converter in a buck-boost mode.

According to various embodiments, in operation 1123, the electronic device may determine whether the second converter has a temperature higher than the first threshold temperature. If the second converter has a temperature lower than or equal to the first threshold temperature, the electronic device may maintain a present operation. For example, the processor 120 of the electronic device may maintain a present operating state so that each of the first converter and the second converter can operate according to the intermediate voltage and the operating mode determined in operation 1121.

According to various embodiments, if the first converter has a temperature higher than the first threshold temperature, in operation 1125, the electronic device may drop an intermediate voltage, may operate the first converter in a buck-boost mode, and may operate the second converter in a boost mode. For example, when an input voltage is 5 volts, an output voltage is 8 volts, and an intermediate voltage is 8 volts, the processor 120 of the electronic device may drop the intermediate voltage of 8 volts to 5 volts, and thus may operate the first converter in a buck-boost mode and operate the second converter in a boost mode.

According to various embodiments, in operation 1127, the electronic device may determine whether the first converter has a temperature higher than the first threshold temperature. If the first converter has a temperature lower than or equal to the first threshold temperature, in operation 1129, the electronic device may maintain a present operating mode. For example, the processor 120 of the electronic device may maintain a present operating state so that each of the first converter and the second converter can operate according to the intermediate voltage and the operating mode determined in operation 1125. If the first converter has a temperature higher than the first threshold temperature, the electronic device may perform operation 1121.

According to various embodiments, when a result of execution of operation 1103 shows that the input voltage coincides with the output voltage, in operation 1131, the electronic device may determine that an intermediate voltage is the output voltage, may operate the first converter in a buck-boost mode, and may operate the second converter in a buck-boost mode. For example, when an input voltage is 8 volts and an output voltage is 8 volts, the processor 120 of the electronic device may determine that an intermediate voltage is 8 volts identical to the value of the output voltage, and thus may operate the first converter in a buck-boost mode and operate the second converter in a buck-boost mode.

According to various embodiments, in operation 1133, the electronic device may determine whether the second converter has a temperature higher than the first threshold temperature. According to various embodiments, if the second converter has a temperature higher than the first threshold temperature, in operation 1135, the electronic device may boost an intermediate voltage, may operate the first converter in a boost mode, and may operate the second converter in a buck mode. For example, when an input voltage is 8 volts, an output voltage is 8 volts, and an intermediate voltage is 8 volts, the processor 120 of the electronic device may boost the intermediate voltage of 8 volts to 10 volts, and thus may operate the first converter in a boost mode and operate the second converter in a buck mode.

According to various embodiments, in operation 1137, the electronic device may determine whether the second converter has a temperature lower than a second threshold temperature. If the second converter has a temperature higher than or equal to the second threshold temperature, in operation 1139, the electronic device may maintain a present operating mode. For example, the processor 120 of the electronic device may maintain a present operating state so that each of the first converter and the second converter can operate according to the intermediate voltage and the operating mode determined in operation 1135. If the second converter has a temperature lower than the first threshold temperature, the electronic device may perform operation 1131.

According to various embodiments, when a result of execution of operation 1133 shows that the second converter has a temperature lower than or equal to the first threshold temperature, in operation 1141, the electronic device may determine whether the first converter has a temperature higher than the first threshold temperature. According to various embodiments, if the first converter has a temperature higher than the first threshold temperature, in operation 1143, the electronic device may drop an intermediate voltage, may operate the first converter in a buck mode, and may operate the second converter in a boost mode. For example, when an input voltage is 8 volts, an output voltage is 8 volts, and an intermediate voltage is 8 volts, the processor 120 of the electronic device may drop the intermediate voltage of 8 volts to 5 volts, and thus may operate the first converter in a buck mode and operate the second converter in a boost mode.

According to various embodiments, in operation 1145, the electronic device may determine whether the first converter has a temperature lower than the second threshold temperature. If the first converter has a temperature higher than or equal to the second threshold temperature, in operation 1147, the electronic device may maintain a present operating mode. For example, the processor 120 of the electronic device may maintain a present operating state so that each of the first converter and the second converter can operate according to the intermediate voltage and the operating mode determined in operation 1143. If the first converter has a temperature lower than the first threshold temperature, the electronic device may perform operation 1131.

According to various embodiments, an operating method of an electronic device may include: determining an intermediate voltage between at least one first converter and a second converter based on an input voltage of the at least one first converter and an output voltage of the second converter; and controlling an operating mode of each of the at least one first converter and the second converter based on the determined intermediate voltage.

According to various embodiments, each of the at least one first converter and the second converter may be configured to support a plurality of operating modes for changing a voltage, the at least one first converter and the second converter may be configured to be connected in series with each other, and the plurality of operating modes for changing the voltage may include at least one of a buck mode for dropping a voltage, a boost mode for boosting a voltage, or a buck-boost mode for repeatedly dropping and boosting a voltage.

According to various embodiments, the determining of the intermediate voltage may include determining the intermediate voltage further based on at least one of an input current of the first converter or an output current of the second converter.

According to various embodiments, the determining of the intermediate voltage may include determining the intermediate voltage further based on at least one of power efficiency or a temperature of each of the at least one first converter and the second converter.

According to various embodiments, the operating method may further include: measuring at least one of a temperature of the at least one first converter or a temperature of the second converter by using at least one temperature sensor; and changing the intermediate voltage between the at least one first converter and the second converter based on at least one of the measured temperature of the at least one first converter or the measured temperature of the second converter.

According to various embodiments, the changing of the intermediate voltage may further include changing the intermediate voltage so as to change an operating mode of at least one converter satisfying a designated temperature condition among the at least one first converter and the second converter.

According to various embodiments, the at least one temperature sensor may be configured to measure a temperature of an inductor included in each of the at least one first converter and the second converter.

According to various embodiments, the operating method may further include: detecting a change in at least one of input power of the first converter or output power of the second converter; and changing the intermediate voltage between the first converter and the second converter in response to detection of the change.

According to various embodiments, the controlling of the operating mode may include: determining an operating mode of the at least one first converter based on the input voltage of the at least one first converter and the determined intermediate voltage; and determining an operating mode of the second converter based on the determined intermediate voltage and the output voltage of the second converter.

According to various embodiments, the at least one first converter may be configured to convert the input voltage into the intermediate voltage and output the converted intermediate voltage; the second converter may be configured to receive the intermediate voltage output from the at least one first converter and convert the received intermediate voltage into the output voltage; and when the number of the at least one first converter is plural, the plurality of first converters may be configured to be connected in parallel and receive input voltages from different external power supply apparatuses.

Electronic devices according to various embodiments set forth in the disclosure may be of various types. An electronic device may include at least one of, for example, a portable communication device (e.g., a smart phone), a computer device, a portable multimedia device, a portable medical device, a camera, a wearable device, or a home appliance. The electronic device according to embodiments of the disclosure is not limited to the above-described devices.

It should be understood that various embodiments of the disclosure and the terms used therein are not intended to limit the technologies set forth herein to particular embodiment forms and include various changes, equivalents, and/or replacements for a corresponding embodiment. With regard to the description of the drawings, similar reference numerals may be used to refer to similar elements. A singular expression may include a plural expression unless the context clearly indicates otherwise. The expression, such as "A or B", "at least one of A and/or B", "A, B, or C" or "at least one of A, B, and/or C", may include all possible combinations of items enumerated with them. The expressions, such as "1st" and "2nd", or "first" and "second", may modify corresponding elements regardless of the importance or order thereof and are only used to distinguish an element from another element without limiting the corresponding elements. When an element (e.g., a first element) is referred to as "(operatively or communicatively) coupled with/to" or "connected to" another element (e.g., a second element), the element may be directly coupled with/to another element, or there may be an intervening element (e.g., a third element) between the element and another element.

As used herein, the term "module" may include a unit implemented in hardware, software, or firmware, and may be used interchangeably with other terms, for example, "logic", "logic block", "component", or "circuitry". A module may be a single integral component, or a minimum unit or part thereof, configured to perform one or more functions. For example, the module may be implemented by an Application-Specific Integrated Circuit (ASIC).

Various embodiments of the disclosure may be implemented in software (e.g., the program 140) including instructions that are stored in a storage medium (e.g., the internal memory 136 or the external memory 138) that is readable by a machine (e.g., a computer). The machine is a device that may invoke the stored instructions from the storage medium and may operate according to the invoked instructions, and may include an electronic device (e.g., the electronic device 101) according to the disclosed embodiments. When the instructions are executed by a processor (e.g., the processor 120), a function corresponding to the instructions may be performed directly by the processor, or may be performed by other elements under the control of the processor. The instructions may include a code generated or executed by a complier or an interpreter. The machine-readable storage medium may be provided in the form of a non-transitory storage medium. In this configuration, the term "non-transitory" simply means that the storage medium does not include a signal and is tangible, and this term does not differentiate between a case where data is semi-permanently stored in the storage medium and a case where the data is temporarily stored in the storage medium.

According to an embodiment, a method according to various embodiments of the disclosure may be provided by being included in a computer program product. The computer program product may be traded as a product between a seller and a buyer. The computer program product may be distributed in the form of a machine-readable storage medium (e.g., a Compact Disc Read Only Memory (CD-ROM)), or may be distributed online via an application store (e.g., Play Store™). In the case of online distribution, at least a part of the computer program product may be temporarily generated or at least temporarily stored in the storage medium, such as a memory of a manufacturer's server, an application store's server, or a relay server.

Each element (e.g., a module or a program) according to various embodiments may include a single entity or multiple entities, or some sub-elements among the above-described corresponding sub-elements may be omitted, or other sub-elements may further be included in the various embodiments. Alternatively, or additionally, some elements (e.g., modules or programs) may be integrated into a single entity, and thus the entity may perform the functions of each of the some elements in the same or similar manner as they were performed by each of the some elements before being integrated. Operations performed by a module, a program, or another element according to various embodiments may be executed sequentially, in parallel, repeatedly, or heuristically; at least some of the operations may be executed in another order or omitted; or other operations may be added.

The invention claimed is:

1. An electronic device comprising:
   a plurality of first buck-boost converters configured to support a plurality of operating modes for changing a voltage,
   wherein the plurality of first buck-boost converters is configured to be connected in parallel and configured to drop or boost input an intermediate voltage received from a plurality of external power supply apparatuses,
   wherein the plurality of first buck-boost converters includes a plurality of first temperature sensors for measuring first temperature of each of the first buck-boost converters;
   a second buck-boost converter configured to support the plurality of operating modes and to drop or boost an intermediate voltage received from the plurality of first buck-boost converters, and be connected in series with the plurality of first buck-boost converters, wherein the second buck-boost converter includes a second temperature sensor for measuring second temperature of the second buck-boost converter; and
   at least one processor,
   wherein the at least one processor is configured to:
      determine the intermediate voltage between the plurality of first buck-boost converters and the second buck-boost converter by comparing the first temperature measured by the first temperature sensors and the second temperature measured by the second temperature sensor with threshold temperature of the plurality of first buck-boost converters and the second buck-boost converter; and
      based on the determined intermediate voltage, control a first operating mode of at least one of the plurality of first buck-boost converters and control a second operating mode of the second buck-boost converter, and
   wherein the first operating mode and the second operating mode include buck-mode for dropping an input voltage, boost-mode for outputting the input voltage, and buck-boost mode for outputting a voltage having a magnitude identical to the input voltage.

2. The electronic device as claimed in claim 1, wherein the at least one processor is configured to determine the intermediate voltage further based on at least one of an input current of the plurality of first buck-boost converters or an output current of the second buck-boost converter.

3. The electronic device as claimed in claim 1, wherein the at least one processor is configured to determine the intermediate voltage further based on at least one of power efficiency.

4. The electronic device as claimed in claim 1, wherein the at least one processor is configured to change the intermediate voltage so as to change an operating mode of at least one converter satisfying a designated temperature condition among the plurality of first buck-boost converters and the second buck-boost converter.

5. The electronic device as claimed in claim 1, wherein the at least one of the first temperature sensors and the second temperature sensor is configured to measure a temperature of an inductor included in each of the plurality of first buck-boost converters and the second buck-boost converter.

6. The electronic device as claimed in claim 1, wherein the at least one processor is configured to:
   detect a change in at least one of input power of the plurality of first buck-boost converters or output power of the second buck-boost converter; and
   change the intermediate voltage between the plurality of first buck-boost converters and the second buck-boost converter in response to detection of the change.

7. The electronic device as claimed in claim 1, wherein the at least one processor is configured to:
   determine an operating mode of the plurality of first buck-boost converters based on the input voltage of the plurality of first buck-boost converters and the determined intermediate voltage; and
   determine an operating mode of the second buck-boost converter based on the determined intermediate voltage and an output voltage of the second buck-boost converter.

8. The electronic device as claimed in claim 1, wherein:
   the plurality of first buck-boost converters are configured to convert the input voltage into the intermediate voltage and output a converted intermediate voltage; and
   the second buck-boost converter is configured to receive the converted intermediate voltage output from the plurality of first buck-boost converters and convert the converted intermediate voltage into an output voltage.

9. An operating method of an electronic device, the operating method comprising:
   determining an intermediate voltage between a plurality of first buck-boost converters and a second buck-boost converter by comparing first temperature measured by first temperature sensor of each of the plurality of first buck-boost converters and second temperature measured by second temperature sensor of the second buck-boost converter with threshold temperature of the plurality of first buck-boost converters and the second buck-boost converter; and
   based on the determined intermediate voltage, controlling a first operating mode of at least one of the plurality of first buck-boost converters and controlling a second operation mode of the second buck-boost converter,
   wherein the plurality of first buck-boost converters is configured to be connected in parallel and configured to drop or boost input voltages received from a plurality of external power supply apparatuses, wherein the second buck-boost converter configured to support the plurality of operating modes and to drop or boost the determined intermediate voltage received from the plurality of the first buck-boost converters, and be connected in series with the plurality of the first buck-boost converters, and wherein the first operating mode and the second operating mode include buck-mode for dropping the input voltages, boost-mode for outputting the input voltages, and buck-boost mode for outputting a voltage having a magnitude identical to the input voltages.

10. The operating method as claimed in claim 9, wherein determining of the intermediate voltage comprises determining the intermediate voltage further based on at least one of an input current of the plurality of first buck-boost converters or an output current of the second buck-boost converter.

11. The operating method as claimed in claim 9, wherein determining of the intermediate voltage comprises determining the intermediate voltage further based on at least one of power efficiency.

12. The operating method of claim 9, further comprising:
detecting a change in at least one of input power to the plurality of first buck-boost converters or output power to the second buck-boost converter; and
in response to detecting the change, changing an intermediate voltage between the plurality of first buck-boost converters and the second buck-boost converter.

13. The operating method as claimed in claim 9, wherein controlling the operation mode further comprises:
determining the operation mode of the plurality of first buck-boost converters based on the input voltages of the plurality of first buck-boost converters and the determined intermediate voltage, and
determining the operating mode of the second buck-boost converter based on the determined intermediate voltage and an output voltage of the second buck-boost converter.

14. An electronic device comprising:
a plurality of first buck-boost converters capable of stepping down or boosting a voltage, wherein the plurality of first buck-boost converters is configured to be connected in parallel and configured to step down or boost input voltages received from a plurality of external power supply apparatuses, and including a plurality of first temperature sensors for measuring first temperature of each of the first buck-boost converters;
a second buck-boost converter connected in series with the plurality of first buck-boost converters and capable of stepping down or boosting an intermediate voltage received from the plurality of the first buck-boost converters and including a second temperature sensor for measuring second temperature of the second buck-boost converter; and
at least one processor,
wherein the at least one processor is configured to:
determine the intermediate voltage between the plurality of first buck-boost converters and the second buck-boost converter by comparing the first temperature measured by the first temperature sensors and the second temperature measured by the second temperature sensor with threshold temperature of the plurality of first buck-boost converters and the second buck-boost converter; and
based on the determined intermediate voltage, control at least one of the plurality of first buck-boost converters to step down or boost and control the second buck-boost converter to step down or boost.

* * * * *